(12) United States Patent
Pearson

(10) Patent No.: US 8,381,116 B2
(45) Date of Patent: Feb. 19, 2013

(54) DISPLAY SYSTEMS AND METHODS FOR DYNAMICALLY UPDATING A GRAPHICAL USER INTERFACE

(75) Inventor: Gregory A. Pearson, Dunedin, FL (US)

(73) Assignee: Gregory A. Pearson, Inc., Dunedin, FL (US)

( * ) Notice: Subject to any disclaimer, the term of this patent is extended or adjusted under 35 U.S.C. 154(b) by 62 days.

(21) Appl. No.: 13/077,360

(22) Filed: Mar. 31, 2011

(65) Prior Publication Data

US 2011/0209078 A1 Aug. 25, 2011

Related U.S. Application Data

(63) Continuation-in-part of application No. 12/709,228, filed on Feb. 19, 2010.

(60) Provisional application No. 61/319,633, filed on Mar. 31, 2010, provisional application No. 61/319,642, filed on Mar. 31, 2010.

(51) Int. Cl.
*G06F 3/048* (2006.01)
*G06F 3/00* (2006.01)

(52) U.S. Cl. ........ 715/767; 715/777; 715/788; 715/798; 715/801; 715/854

(58) Field of Classification Search .................. 715/776, 715/777, 788, 798, 801, 854
See application file for complete search history.

(56) References Cited

U.S. PATENT DOCUMENTS

| | | | |
|---|---|---|---|
| 6,166,736 A * | 12/2000 | Hugh | 715/798 |
| 2005/0183030 A1* | 8/2005 | Bertram et al. | 715/800 |
| 2006/0218500 A1* | 9/2006 | Sauve et al. | 715/767 |
| 2008/0189645 A1* | 8/2008 | Kapanen et al. | 715/777 |

* cited by examiner

*Primary Examiner* — Adam M Queler
*Assistant Examiner* — Andrea Long
(74) *Attorney, Agent, or Firm* — Troutman Sanders LLP; James E. Schutz; Alicia L. W. Brewster

(57) ABSTRACT

A display system provides a graphical user interface having a dynamic display field, which is contained within a useable display area. The dynamic display field can have an expanded state and collapsed state, and the current state of the dynamic display field can depend on properties of the useable display area. When collapsed, the dynamic display area has a shared content area and two or more content tags. Each content tag can be active or inactive, and the shared content area shows displayable contents corresponding to active content tags. Tags are activated and deactivated based on user selections. When expanded, the dynamic display field includes dedicated content areas, where each dedicated content area shows a displayable content. Accordingly, when the useable display space allows, the dynamic display field can automatically transition to the expanded state, thereby enabling a greater amount of content to be displayed at a time.

18 Claims, 59 Drawing Sheets

DISPLAY SYSTEMS AND METHODS FOR DYNAMICALLY UPDATING A GRAPHICAL USER INTERFACE

CROSS-REFERENCE TO RELATED APPLICATIONS

This application claims the benefit of priority under 35 U.S.C. §119(e) to U.S. Provisional Patent Application Nos. 61/319,633 and 61/319,642, both filed 31 Mar. 2010. This application is also a continuation-in-part of, and claims priority to, U.S. patent application Ser. No. 12/709,228, filed 19 Feb. 2010. The entire contents and substance of these three priority applications are hereby incorporated by reference as if fully set out below.

TECHNICAL FIELD

Various embodiments of the present invention relate to graphical user interfaces and, more particularly, to display systems and methods for providing dynamic display fields in a graphical user interface, wherein the dynamic display fields automatically expand or collapse based on a useable display size.

BACKGROUND

Users generally interact with computing devices through graphical user interfaces, which can display relevant content to users in a user-friendly, graphical manner. A graphical user interface is bounded by aspects of the computing device on which it is presented. For example, a graphical user interface can be limited to a virtual window or other bounding space provided for a software application underlying the graphical user interface.

In some instances, the size of the space provided to a graphical user interface restricts the amount of content that can be presented to a user. To handle these instances, software applications may limit the amount of content displayed to the user in a graphical user interface to an amount that can be squeezed into an expected size of available space. Alternatively, some software applications include scroll bars, so that the user can scroll between portions of the graphical user interface when the entire graphical user interface does not fit into the available space. Unfortunately, these partial solutions to unpredictable or changing available space do not enable the user to control what is displayed and do not adequately take advantage of available space when that space is relatively large.

Therefore, there is a need for a graphical user interface that can effectively adapt to the space provided for displaying content. In an exemplary embodiment, such a graphical user interface can make all contents available, even when the space provided is relatively small, by allowing a user to easily switch between available contents. It would be further desirable, when that available space increases, for a graphical user interface to expand and provide dedicated display areas for content that would not have dedicated space if the total available space were relatively small. It is to embodiments of such graphical user interfaces that various embodiments of the present invention are directed.

SUMMARY

Exemplary embodiments of the present invention can include dynamic display fields, graphical user interfaces, and display systems and methods. A display system according to some embodiments of the present invention can provide dynamic display fields within graphical user interfaces. A dynamic display field can be contained within a useable display area, and can expand or collapse based on the size of the useable display area. To provide the dynamic display field within a graphical user interface, the display system can comprise a display unit, a detection unit, and a computer processor.

The display unit can communicate or display a display field to a user. The dynamic display field can be used to display one or more displayable contents associated with the dynamic display field. The dynamic display field can have a collapsed state and an expanded state.

In the collapsed state the dynamic display field can comprise a shared content area and two or more content tags. Each of the content tags can correspond to one of the displayable contents associated with the dynamic display field. A content tag can move between an active state and an inactive state based on selections of a user, where at least one of the content tags is inactive at a given time. Displayable contents corresponding to active content tags can be shown in the content area, while at least one displayable content associated with an inactive content tag can be temporarily hidden from view until a user's selections make inactive content tag active.

In the expanded state, the dynamic display field can comprise two or more dedicated content areas. Each content area can be dedicated to displaying one of the displayable contents associated with the dynamic display field, such that an increased number of displayable contents are shown to the user at a time, as compared to the collapsed state. In some exemplary embodiments, each displayable content has a dedicated content area in the expanded state of the dynamic display field, so that all displayable contents are simultaneously viewable by the user.

The detection unit of the display system can detect changes to the useable display area. The appropriate state of the dynamic display field can depend on one or more properties of the useable display area containing the dynamic display field. For instance, if a measure of the useable display field exceeds a threshold value, then the dynamic display field can automatically and dynamically be placed into an expanded state. Conversely, if the useable display area does not exceed the threshold, then the dynamic display field can automatically and dynamically be placed in the collapsed state. The detection unit can detect changes to these properties to enable the display system to determine when and how to update the state of the dynamic display field.

The computer processor can transition the dynamic display field between the collapsed and expanded states as indicated by properties of the useable display area detected by the detection unit. Accordingly, the dynamic display field can adapt to the useable display area to present the user with an increased amount of content when increased space is available for presenting content.

These and other objects, features, and advantages of the dynamic display fields, graphical user interfaces, and display systems and methods will become more apparent upon reading the following specification in conjunction with the accompanying drawing figures.

BRIEF DESCRIPTION OF THE FIGURES

FIGS. 27-57 illustrate various screenshots of four-column graphical user interfaces that can be provided by the display system, according to an exemplary embodiment of the present invention.

DETAILED DESCRIPTION

Figure 1:
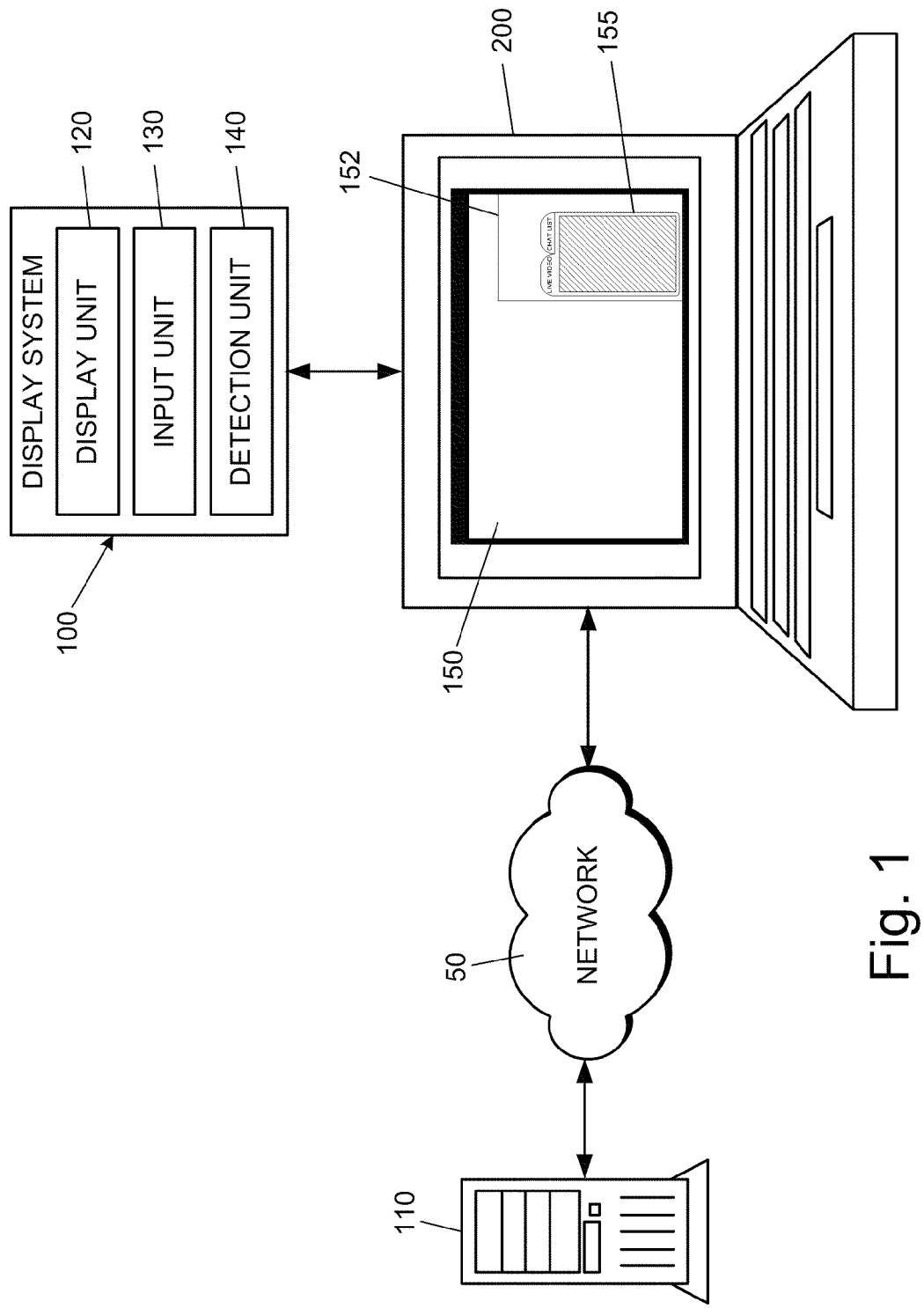
FIG. 1 illustrates relationships between various elements involved a display system, according to an exemplary embodiment of the present invention.

Exemplary embodiments of the present invention comprise dynamic graphical user interfaces and dynamic display fields for graphical user interfaces. To facilitate an understanding of the principles and features of the present invention, various exemplary embodiments are explained below for illustrative purposes. In particular, embodiments of the graphical user interface are described in the context of incorporating dynamic display fields configured to horizontally expand, multiply, divide, or collapse based on the size of the virtual window containing the graphical user interface. Embodiments of the invention, however, are not limited to this context. Rather, embodiments of the invention can facilitate many variations of dynamically updating a graphical user interface based on the size of a virtual window or other useable display area. For example, and not limitation, a dynamic display field of a graphical user interface can expand vertically, as opposed to horizontally.

The components described hereinafter as making up various elements of the invention are intended to be illustrative and not restrictive. Other suitable components that would perform the same or similar functions as components described herein are intended to be embraced within the scope of graphical user interfaces of the present invention. Such other components not described herein but potentially embraced by the invention may include, but are not limited to, for example, components developed after development of the invention.

Referring now to the figures, wherein like reference numerals represent like parts throughout the views, various embodiments of dynamic display fields, graphical user interfaces, and display systems and methods for providing same will be described in detail.

FIG. 1 illustrates a diagram depicting exemplary relationships between a display system 100, a graphical user interface 150, and a dynamic display field 155 of the present invention. According to embodiments of the present invention, a display system 100 can provide a graphical user interface 150 of the present invention, and can be integrated, in whole or in part, into a computing device 200. The display system 100 can be in many forms, including a local software application, a remote application accessed by a web client, one or more hardware components, or a combination of these. In an exemplary embodiment, the display system 100 graphically displays data and is integrated into another system having one or more utilities, in order to display data for the one or more utilities.

The graphical user interface 150 can be provided by the display system 100 as a means for a user to interact with an underlying utility serviced by the display system 100. The graphical user interface 150 can receive input from the user and communicate that input to the underlying utility. The display system 100 can dynamically update the graphical user interface 150 using a dynamic display field 155, which can occupy all or a portion of the graphical user interface 150. For example, and not limitation, if the graphical user interface 150 is embodied in a web page or website, the dynamic display field 155 can be a frame integrated into the web page or website. If the graphical user interface 150 is the interface for a local software application, then the dynamic display field 155 can be, for example, a portion of a virtual window in which the local application is displayed.

If the display system 100 is implemented as part of a web application, then the display system 100 can be operated remotely, such as by a server 110. The server 110 can be configured to service a website or otherwise communicate data to be displayed on the computing device 200. In that case, the display system 100 can display the graphical user interface 150 onto the local computing device 200 by way of transmitting instructions from the server 110 to the computing device 200 over a network 50.

As shown in FIG. 1, the display system 100 can comprise one or more units for operation of various tasks of the display system 100. These units of the display system 100 can be modules, applications, devices, systems, services, or combinations or portions thereof. Such units of the display system 100 can include a display unit 120, an input unit 130, and a detection unit 140. Although the display system 100 is shown in FIG. 1 as being embodiment in the computing device 200, if the display system 100 is operated by the server 110, then as mention above, the display system 100 can be embodiment on the server 110, which can communicate aspects of the display system 100 to the computing device 200.

The display unit 120 can draw the graphical user interface 150, including the dynamic display field 155. In some instances, drawing the graphical user interface 150 and the dynamic display field 155 can comprise communicating drawing instructions to a web client or from the server 110 to the computing device 200. The input unit 130 can receive and interpret a user's interactions with the graphical user interface 150. These interactions can indicate, for example, how to update the dynamic display field 155. The detection unit 140 can detect changes to a useable display area 152 in which the dynamic display field 155 is contained, which can affect the state of the dynamic display field 155, as will be described in more detail below. The units of the display system 100 can utilize a computer processor of the computing device 200 or the server 110 for performing various operations, and can be in communication with one another as necessary to perform tasks for the display system 100.

The display system 100 can provide or recognize the boundaries of a useable display area 152, which can contain all or a portion of the dynamic display field 155 within the graphical user interface 150. The dynamic display field 155 of the graphical user interface 150 can change its state in response to changes in the size of the useable display area 152. For instance, when the width of the useable display area 152 is below a predetermined threshold, the dynamic display field 155 can be in a collapsed state. Analogously, when the width of the useable display area 152 is at or above a predetermined threshold, the dynamic display field 155 can be in an expanded state. Accordingly, the dynamic display field 155 can make effective use of the useable display area 152.

In the collapsed state, the dynamic display field 155 can comprise a shared content area 320 (see FIG. 3) and two or more content tags 330 (see FIG. 3). Each content tag 330 can correspond to a displayable content 350 (see FIG. 3) that can be displayed within the shared content area 320. In the collapsed state, the dynamic display field 155 may not have enough room to show all of these displayable contents 350 at once, so the shared content area 320 can be limited to displaying fewer than all available displayable contents 350 at any given time. In an exemplary embodiment, for example, only one displayable content 350 at a time can be displayed in the shared content area 320 of a dynamic display field 155. A user can switch between which contents are displayed in the shared content area 320 by activating and deactivating content tags 330 corresponding to the displayable contents 350.

In contrast, when the dynamic display field 155 is in an expanded state, a greater number of the displayable contents 350 can be presented in the dynamic display field 155 at a time. For example, and not limitation, the shared content area 320 can be replaced by two or more shared content areas 320, separate dedicated content areas 410 (see FIG. 4), or a combination of shared and dedicated content areas 320 and 410. For example, in a dynamic display field 155 associated with two displayable contents 350, the shared content area 320 can be replaced with a first content area and a second content area. The first content area can display the first displayable content, and the second content area can display the second displayable content, such that both contents are viewable to the user at once.

The display system 100 can detect changes in the size of the useable display area 152. When the dynamic display field 155 is in a collapsed state and the size of the useable display area 152 increases to at least or greater than a threshold size, then the display system 100 can update the dynamic display field 155 to the expanded state. When the dynamic display field 155 is in the expanded state, and the size of the useable display area 152 decreases to or below the threshold, then the display system 100 can update the dynamic display field 155 to the collapsed state. Accordingly, the dynamic display field 155 can dynamically update within the graphical user interface 150 based on the size of the display area allotted.

Figure 2:
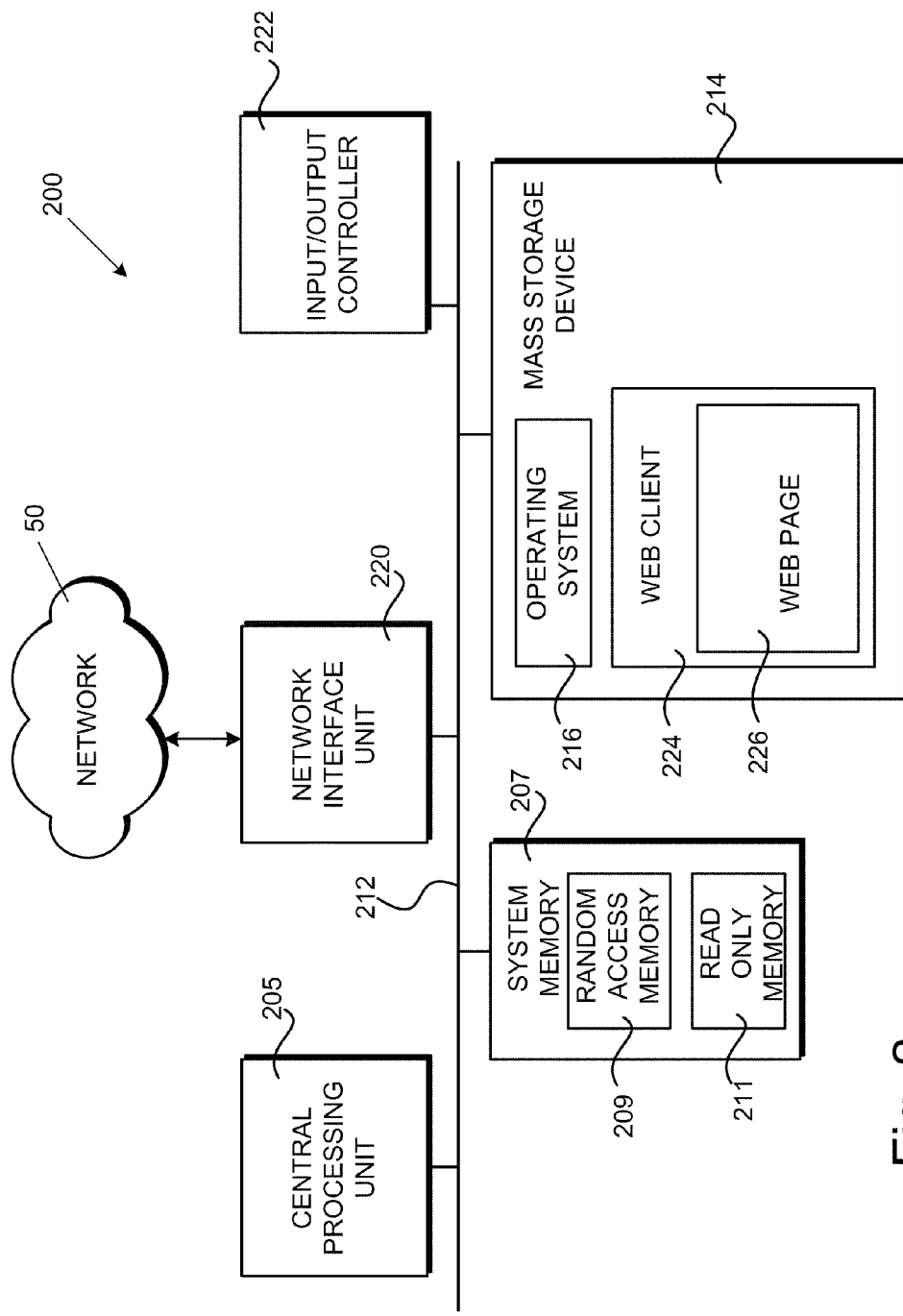
FIG. 2 illustrates a computer architecture for a computing device on which the graphical user interface can be displayed by the display system, according to an exemplary embodiment of the present invention.

FIG. 2 illustrates a computer architecture for the computing device 200, on which the graphical user interface 150 can be displayed by the display system 100. Those skilled in the art will recognize that the general architecture described with reference to FIG. 2 is for example only, and can be modified to accommodate various embodiments of the display system 100 and particular operational environments. As shown in FIG. 2, the computing device 200 can comprise a central processing unit 205 and one or more system memories 207, such as a random access memory 209 ("RAM") and a nonvolatile memory, such as a read-only memory ("ROM") 211. The computing device 200 can further comprise a system bus 212 coupling together the memory 207, the processing unit 205, and various other components. A basic input/output system containing routines to assist in transferring information between components of the computing device 200 can be stored in the ROM 211. Additionally, the computing device 200 can include a mass storage device 214 for storing an operating system 216, application programs, and other program modules.

The mass storage device 214 can be connected to the processing unit 205 through a mass storage controller (not shown) connected to the bus 212. The mass storage device 214 and other computer-readable media can comprise computer storage media, which can include volatile and non-volatile, removable and non-removable media implemented in any method or technology for storage of information, such as computer-readable instructions, data structures, program modules, or other data. Computer storage media includes, but is not limited to, RAM, ROM, EPROM, EEPROM, flash memory, other solid state memory technology, CD-ROM, digital versatile disks ("DVD"), other optical storage, magnetic cassettes, magnetic tape, magnetic disk storage, other magnetic storage devices, or various other media used to store data accessible by the computing device 200.

A number of program modules and data files can be stored in the computer storage media and RAM 209 of the computing device 200. Such program modules and data files can include an operating system 216 suitable for controlling operations of a networked personal computer. A web browser application program, or web client 224, can also be stored on the computer storage media and RAM 209. The web client 224 may comprise an application program for requesting and rendering web pages 226 created in Hypertext Markup Language ("HTML") or other types of markup languages. The web client 224 can be capable of executing scripts through the use of a scripting host. The scripting host executes program code expressed as scripts within the browser environment.

Computer-readable instructions on the storage media of the computing device 200 can include, for example, instructions for implementing processes of the display system 100 or for implementing a web client 224 for receiving instructions from the display system 100 when operated remotely. These instructions can be executed by the computer processor 205 to enable use of the display system 100. If a server 110 operates the display system 100 remotely from the computing device 200 on which the graphical user interface 150 is displayed, then a computer processor 205 at the server 110 can execute instructions on computer storage media accessible by the server 110 for operating processes of the display system 100.

The computing device 200 may operate in a networked environment using logical connections to remote computers, such as the server 110, over a network 50, such as the Internet. The computing device 200 can connect to the network 50, the server 110, and other remote computers through a network interface unit 220 connected to the bus 212.

The computing device 200 can also include an input/output controller 222 for receiving and processing input from a number of input devices, including a keyboard, mouse, or electronic stylus. Interactions between the input devices and the graphical user interface 150 can be detected by the input/output controller 222 to provide meaningful input to the computing device 200. The input/output controller 222 can additionally provide output, which can be in the form of the graphical user interface 150 provided by the display system 100. The output can be provided to a display screen, a printer, or other type of output device.

Figure 3A:
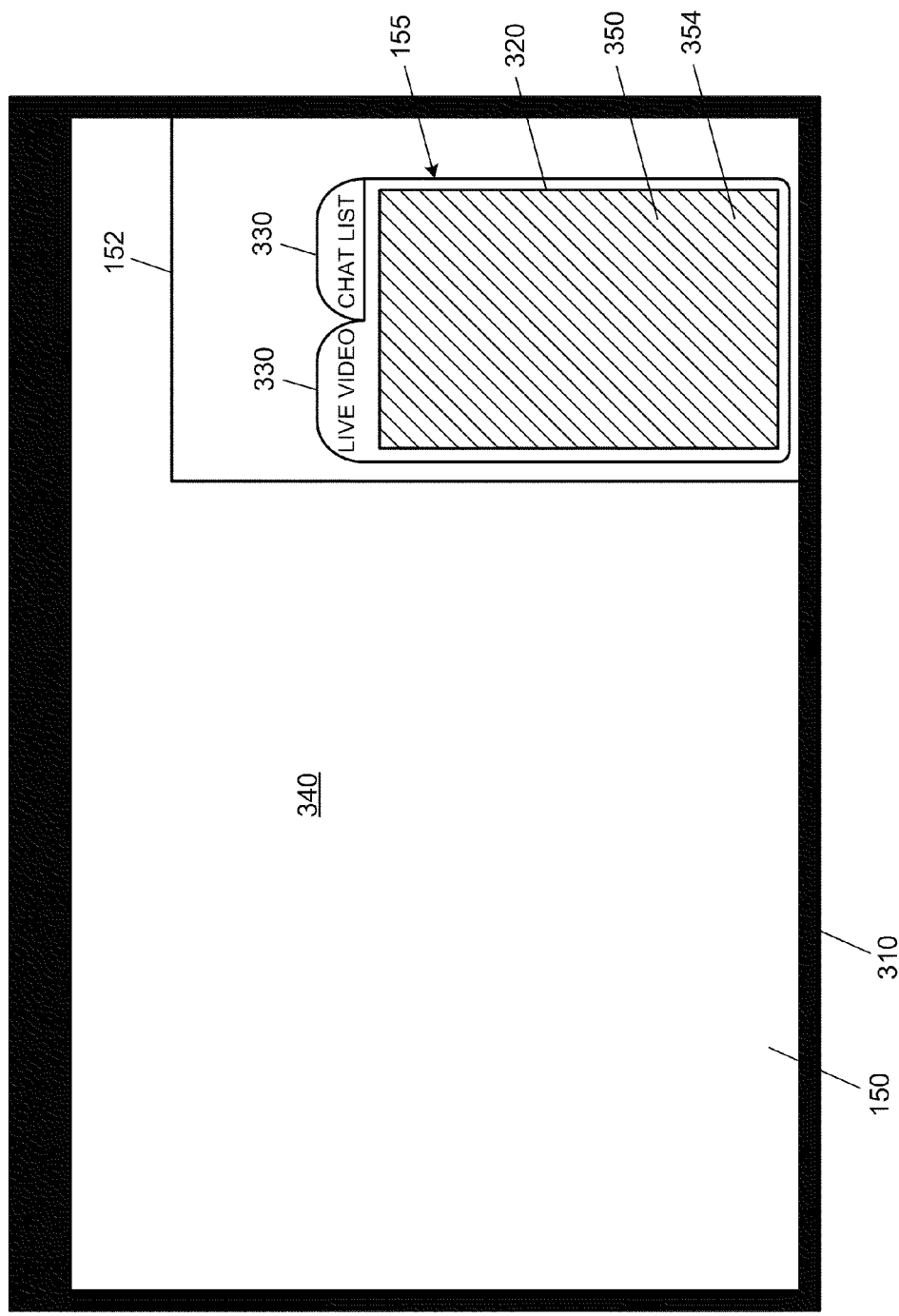
FIGS. 3A-3B illustrate views of a graphical user interface having a dynamic display field in a collapsed state, as provided by the display system, according to an exemplary embodiment of the present invention.
Figure 3B:
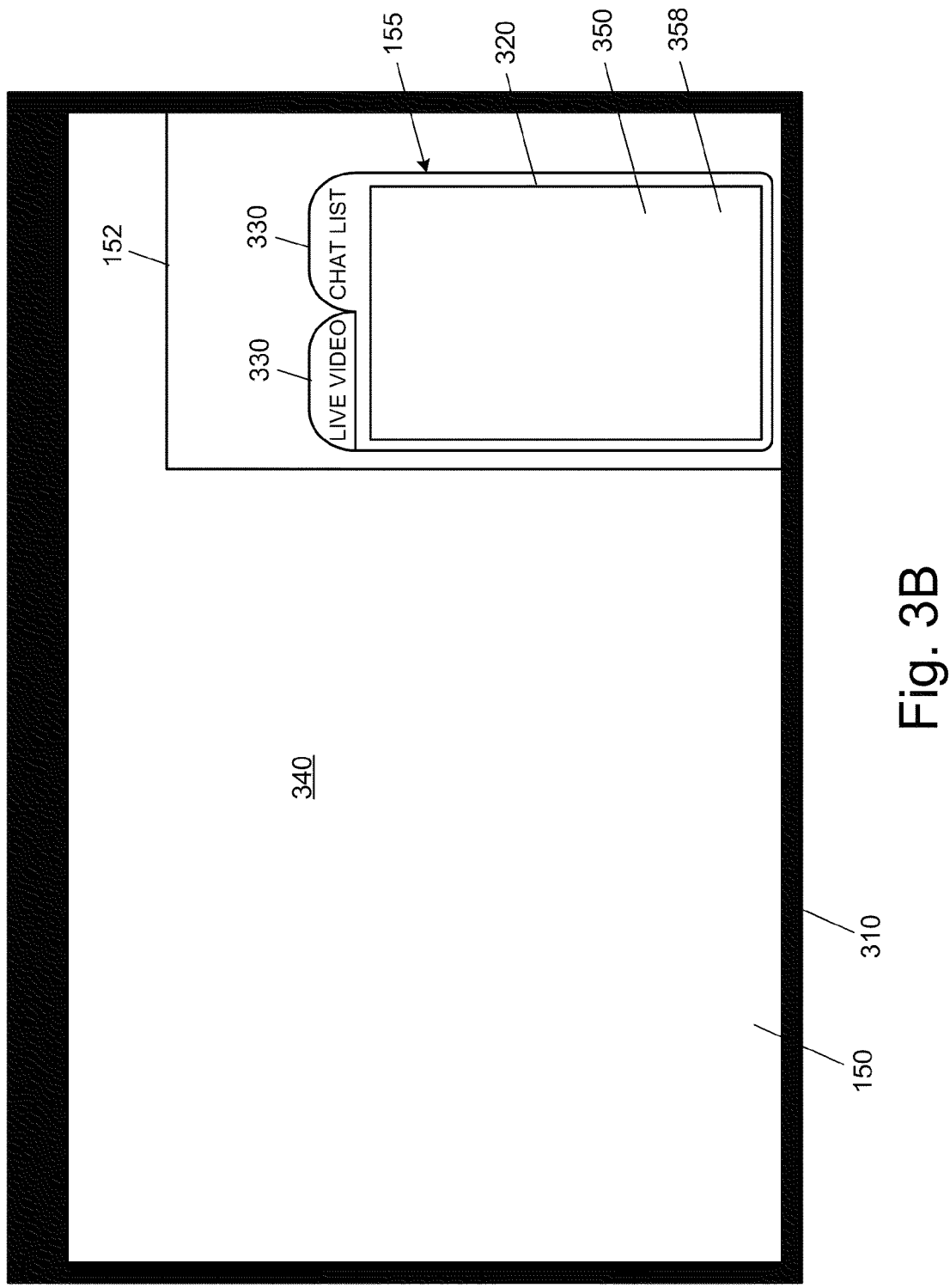

FIGS. 3A-3B illustrate views of a graphical user interface 150 having a dynamic display field 155 in a collapsed state, as provided by the display system 100, according to an exemplary embodiment of the present invention. As shown, the graphical user interface 150 can be displayed inside a virtual window 310, such as a window provided by an operating system 216, or some other appropriate container for the graphical user interface 150. The graphical user interface 150 can enable the user to interact with the computing device 200 or a utility provided by the computing device 200. The graphical user interface 150 can provide various content 340 to the user, and one or more dynamic display fields 155 can be among the content 340 displayed to the user in the graphical user interface 150.

In an exemplary embodiment of the display system 100, the dynamic display field 155 can be confined to a useable display area 152 within the graphical user interface 150. The useable display area 152 can limit the boundaries of the dynamic display field 155, such that all or a predetermined portion of the dynamic display field 155 can be required to remain completely inside the useable display area 152. The size and shape of the useable display area 152 can relate to the size and shape of the entire graphical user interface 150 in various ways. For example, in some embodiments, the useable display area 152 can be the entire space of the graphical user interface 150, while in other embodiments, the useable display area 152 can be a portion of the graphical user interface 150, as shown in FIG. 3. Although the useable display area 152 is depicted as being framed in FIG. 3, this need not be the case. In some embodiments, the size, shape, and position of the useable display area 152 need not be apparent to the user, as long as the display system 100 is aware of the relevant characteristics of the useable display area 152.

As mentioned above, the dynamic display field 155 can have multiple states, and the state of the dynamic display field 155 at a given time can depend at least partially on characteristics of the useable display area 152. The states of the dynamic display field 155 can include a collapsed state and an expanded state, where the expanded state can be used when the size or shape of useable display area 152 prohibits use of the expanded state. If the useable display area 152 becomes larger or smaller in one or more dimensions or in total area, then the dynamic display field 155 can respond by changing between states appropriately to accommodate or make better use of the size, shape, or combined size and shape of the useable display area 152.

As shown in FIGS. 3A-3B, in the collapsed state, the dynamic display field 155 can comprise a shared content area 320 and two or more content tags 330. Additionally, the dynamic display field 155 can be associated with two or more displayable contents 350, including a first displayable content 354 (see FIG. 3A) and a second displayable content 358 (see FIG. 3B). In an exemplary embodiment, dynamic display field 155 is associated with one displayable content 350 per content tag 330 of the dynamic display field 155, and each content tag 330 can correspond to one of the associated displayable contents 350. In other words, the number of displayable contents 350 associated with the dynamic display field 155 can equal the number of content tags 330 of the dynamic display field 155. For example, the dynamic display field 155 can have two content tags 330, as shown in FIG. 3, and can be associated with two displayable contents 350. Further, a first of the two content tags 330 can correspond to a first of the two displayable contents 350, and a second of the two content tags 330 can correspond to a second of the two displayable contents 350.

Each content tag 330 can include a label indicating or describing its corresponding displayable content 350, so as to convey to a user the type of content that will be shown in the shared content area 320 when activating a certain content tag 330. In the example of FIG. 3, two content tags 330 are provided, corresponding to two displayable contents 350. The first of the two content tags 330 is labeled "LIVE VIDEO" to indicate that it corresponds to a displayable content 350 related to a live video feed. The second of the two content tags 330 is labeled "CHAT LIST" to indicate its correspondence to a displayable content 350 that lists ongoing chats. Content tags 330 and displayable contents 350 are not limited to these labels and substances, but can include many labels and substances, based on the desires of those producing, operating, or otherwise using the display system 100.

The shared content area 320 can be limited to displaying only a predetermined number of the available displayable contents 350 at a given time, and that predetermined number can generally be less than the total number of displayable contents 350 associated with the dynamic display field 155. For example, as shown in FIGS. 3A-3B, the shared content area 320 can only display a single displayable content 350 at a given time, but the dynamic display field 155 has two content tags 330 and is associated with two corresponding displayable contents 354 and 358. In some exemplary embodiments, the shared content area 320 can display only a single displayable content 350, as in FIGS. 3A-3B. Other exemplary embodiments, however, can provide shared content areas 320 capable of containing multiple displayable contents 350 at once. Some shared content areas 320 may even modify the number of displayable contents 350 shown at a given time based on the size and shape of the useable display area 152, when that size and shape indicates a collapsed state but is still large enough to contain multiple displayable contents 350.

Like the dynamic display field 155, each content tag 330 can be capable of being in multiple states, including an active state and an inactive state. When a content tag 330 is inactive, its corresponding displayable content 350 is not displayed in the shared content area 320. Alternatively, when a content tag 330 is active, then the displayable content 350 corresponding to that active content tag 330 can be displayed by the display system 100 in the shared content area 320 of the dynamic display field 155. As shown by comparing FIGS. 3A-3B against each other, different displayable contents 354 and 358 can appear in the shared content area 320 based on which content tags 330 are active. Because the shared content area 320 can display fewer than the total number of associated displayable contents 350, at least one content tag 330 can be inactive at a given time.

The displayable contents 350 shown in the shared content area 320 can be selected based on which content tags 330 are active, where active content tags 330 correspond to displayed contents, and inactive content tags 330 correspond to contents that are not currently displayed in the shared content area 320. A user can select content tags 330, such as with a mouse or other input device, to make content tags 330 active or inactive. For example, and not limitation, a dynamic display field 155 can have two content tags 330 corresponding to two displayable contents 350. When a user selects the first content tag 330, the first content tag 330 can become active, and the displayable content 350 is displayed in the shared content area 320. When the shared content area 320 can show only a single displayable content 350 at a time, as in FIGS. 3A-3B, when the first content tag 330 becomes active, the second content tag 330 can simultaneously become inactive, so that the second displayable content 358 is no longer displayed in the shared content area 320. Therefore, by swapping selections between the first and second content tags 330, the user can toggle between viewing the first displayable content 354 and the second displayable content 358.

Figure 4:
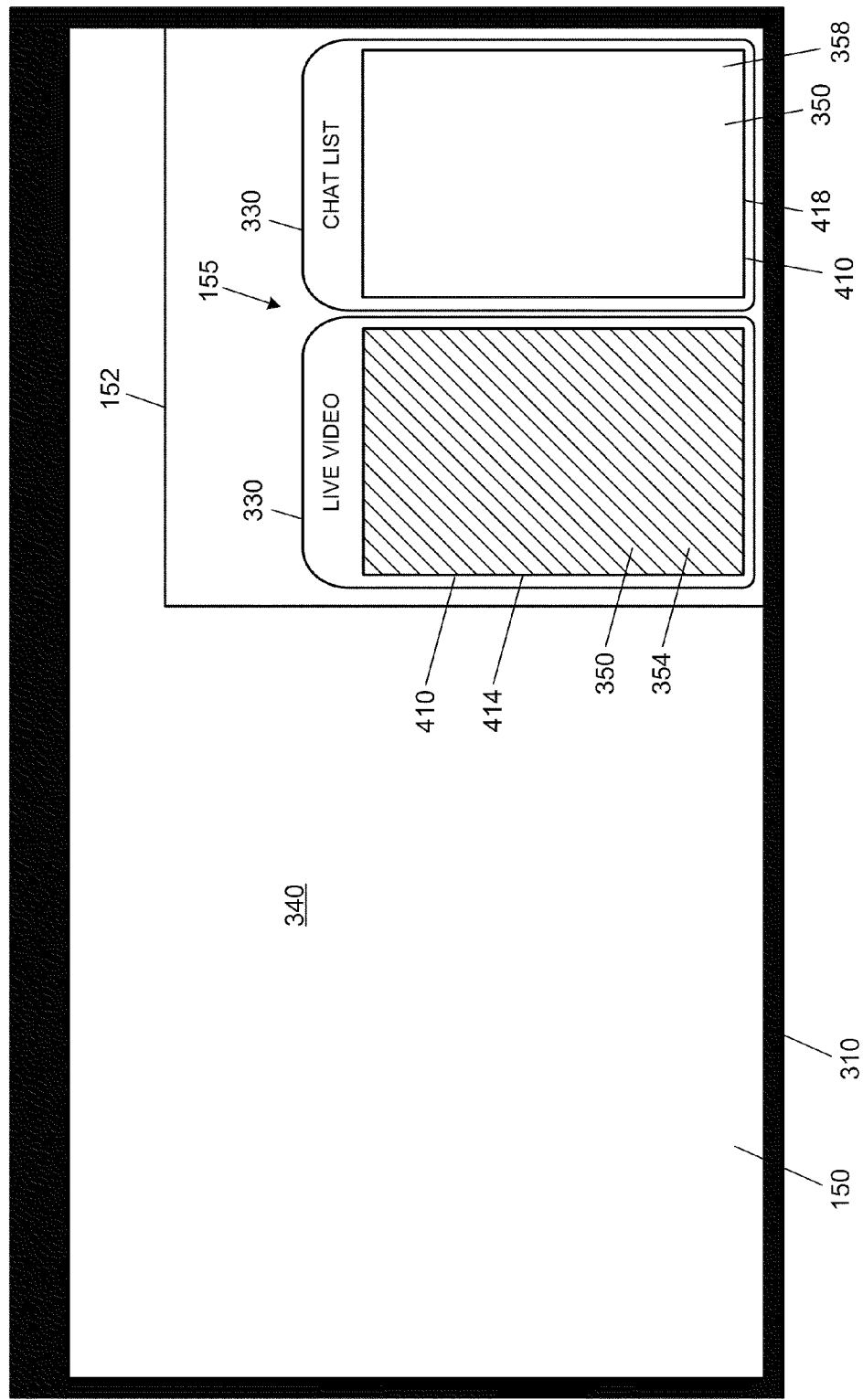
FIG. 4 illustrates the graphical user interface having the dynamic display field in an expanded state, according to an exemplary embodiment of the present invention.

FIG. 4 illustrates the graphical user interface 150 of FIG. 3 having its dynamic display field 155 in an expanded state, according to an exemplary embodiment of the present invention. When in the expanded state, the dynamic display field 155 can have separate, dedicated content areas 410 in place of or in addition to the shared content area 320. The dynamic display field 155 of FIG. 4 depicts an expanded state of the dynamic display field 155 appearing in FIGS. 3A-3B. As shown, in place of the single shared content area 320, distinct first and second content areas 414 and 418 are provided.

Each separate content area 414 and 418 can correspond to individual displayable contents 350 and can be dedicated to displaying its corresponding displayable content 350. In this manner, the expanded state can enable more displayable contents 350 to be viewed at a single time than could be viewed when the same dynamic display field 155 was in its collapsed state. In some exemplary embodiments, an expanded dynamic display field 155 includes a dedicated content area 410 for each displayable content 350. In other exemplary embodiments, however, while the expanded state can enable a greater number of the displayable contents 350 to be viewed at a time than were viewable in the collapsed state, some displayable contents 350 may still share a content area 320. In that case, even in an expanded state, content tags 330 can still be used to allow a user to select between displayable contents 350.

As shown in FIG. 4, the dynamic display field 155 with two associated displayable contents 350 can expand to include a first content area 414 and a second content area 418. The first displayable content 354 can be shown in the first content area 414, while the second displayable content 358 is shown at the same time in the second content area 418. Although the content tags 330 may lose some of their utility in the expanded state of the dynamic display field 155, the content tags 330 can still be provided in the expanded state to label their corresponding displayable contents 350. In the expanded state, however, the content tags 330 can all remain in active states if each displayable content 350 has a dedicated content area 410, as shown in FIG. 4.

The display system 100 can transition the dynamic display field 155 between expanded and collapsed states based on detected properties, or changes to properties, of the useable display area 152. If a predetermined first set of criteria are met, the display system 100 can provide the dynamic display field 155 in the expanded state. If a predetermined second set of criteria are met, the display system 100 can provide the dynamic display field 155 in the collapsed state. In some exemplary embodiments, where only the two states are provided, these two sets of criteria can be the reverses of each other, such that at any time, one and only one of these sets of criteria are met, and the appropriate state of the dynamic display field 155 is thereby determined. Accordingly, in that case, the two sets of criteria can be thought of a single set of criteria that determines whether the dynamic display field 155 should be in a particular one of the two states, collapsed or expanded, and failure to meet the criteria can indicate that the other state should be applied. In other exemplary embodiments, however, intermediate states between expanded and collapsed can also be provided, and in that case, the two sets of criteria used to determine whether the dynamic display field 155 is in an expanded or collapsed need not be reverses of each other.

As mentioned, the criteria for determining an appropriate state of the dynamic display field 155 can be based on one or more properties of the useable display area 152. For example, the criteria can require that a measure of the useable display area 152 meet or exceed a predetermined threshold for the expanded state to be applied. The relevant measure of the useable display area 152 can be, for example, the height, width, or area of the useable display area 152. For example, if the useable display area 152 is wider than, or at least as wide as, the predetermined threshold, then the expanded state can apply. Conversely, if the useable display area 152 is narrower than, or at least as narrow as, the predetermined threshold, then the collapsed state can apply to the dynamic display field 155. Alternatively, the criteria for determining an appropriate state can consider height, area, or a combination of width, height, and area, instead of just the width of the useable display area 152.

The positions of the dedicated content areas 410 within the dynamic display field 155 and within the useable display area 152 can depend on the size and shape of the useable display area 152. For example, and not limitation, an exemplary embodiment of the display system 100 can apply the expanded state to the dynamic display field 155 when the height of the useable display area 152 exceeds a first predetermined threshold or when the width of the useable display area 152 exceeds a second predetermined threshold. In that case, if the height of the useable display area 152 exceeds the first threshold but the width of the useable display area 152 does not exceed the second threshold, then the dedicated content areas 410 can be positioned top-to-bottom or in some manner that otherwise makes use of the provided vertical space. Conversely, if the width of the useable display area 152 exceeds the second threshold but the height of the useable display area 152 does not exceed the first threshold, then the dedicated content areas 410 can be positioned side-by-side or in some manner that otherwise makes use of the provided horizontal space. For an alternative example, if the only threshold criteria used to determine an appropriate state of the dynamic display field 155 relates to the width of the useable display area 152, then the dedicated content areas 410 can always be positioned side-by-side when the useable display area 152 exceeds the width threshold and the dynamic display field 155 is placed in the expanded state. Analogously, for another example, if the only threshold criteria used to determine an appropriate state relates to the height of the useable display area 152, then the dedicated content areas 410 can always be positioned top-to-bottom when the useable display area 152 exceeds the height threshold and the dynamic display field 155 is placed in the expanded state.

Transitioning the dynamic display field 155 to an expanded state can make efficient use of space provided in the useable display area 152. When the dynamic display field 155 becomes expanded due to a width increase in the useable display area 152, then the width of the space occupied by the resulting dedicated content areas 410 can exceed the width of the shared content area 320 in the collapsed state. Analogously, when the dynamic display field 155 becomes expanded due to a height increase in the useable display area 152, then the height of the space occupied by the resulting dedicated content areas 410 can exceed the height of the shared content area 320 in the collapsed state. As a result, the dynamic display field 155 can enable a user to view an increased amount of total content by utilizing the space provided. This beneficial feature of the dynamic display field 155 is illustrated by comparing FIG. 4 with FIGS. 3A-3B. As compared with FIGS. 3A-3B, the useable display area 152 of FIG. 4 is wider because of an increase in the size of the virtual window 310 containing the graphical user interface 150. To take advantage of the increased horizontal space, the shared content area 320 of FIG. 3 is replaced with the side-by-side dedicated content areas 410 of FIG. 4, which have a greater combined width than the shared content area 320. In the dedicated content areas 410, a user can simultaneously view two displayable contents 350, while only one displayable content 350 was viewable at a time with the dynamic display field 155 in the collapsed state.

Figure 5A:
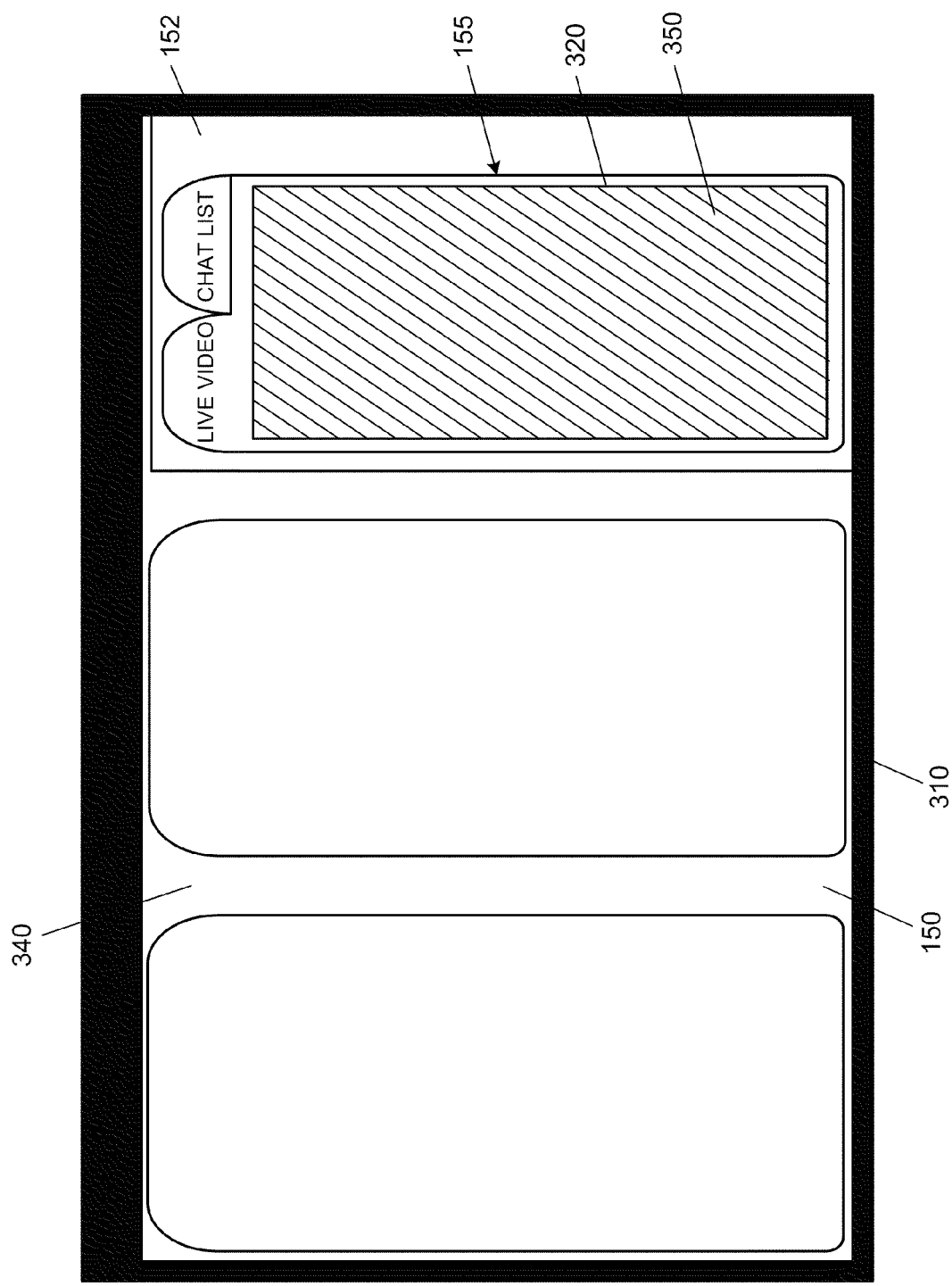
FIGS. 5A-5B illustrate an exemplary use of the dynamic display field, according to an exemplary embodiment of the present invention.
Figure 5B:
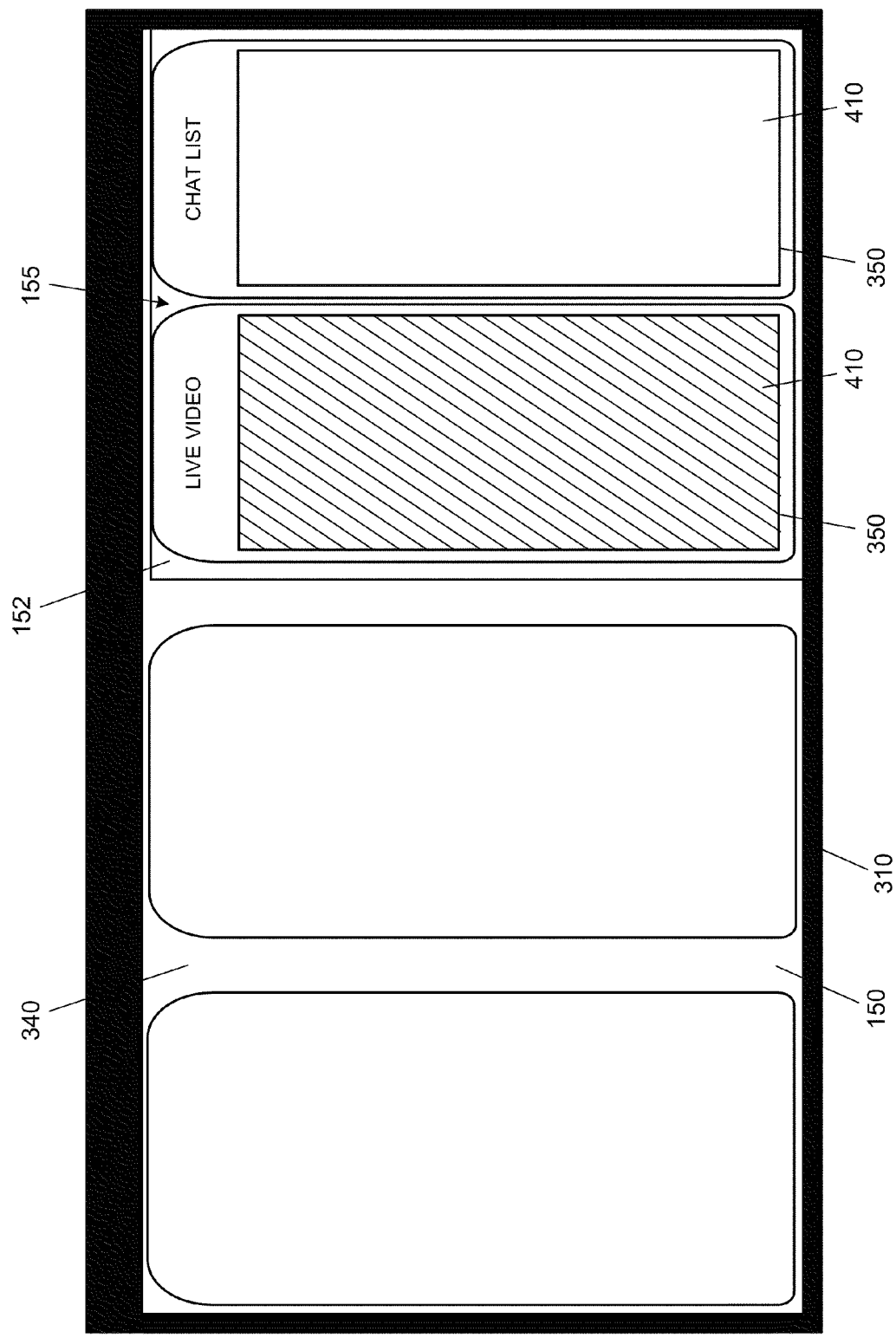

The dynamic display field 155 can be integrated into the graphical user interface 150 in various ways to enhance a user's experience with the graphical user interface 150. For example, and not limitation, FIGS. 5A-5B illustrate a use of the dynamic display field 155. As shown, the overall content 340 of the graphical user interface can include, in addition to the dynamic display field 155, two columns of substance, which can be a combination of graphics, text, or other media.

When the dynamic display field 155 is in the collapsed state, as in FIG. 5A, the depicted graphical user interface 150 can appear to have a total of three columns, with the third column being the dynamic display field 155 and enabling the user to select which displayable content 350 is presented. As shown in FIG. 5B, horizontally expanding the window 310 in which the graphical user interface 150 is displayed can stretch the useable display area 152, thereby causing the dynamic display field 155 to transition into the expanded state. As a result, the graphical user interface 150 can appear to have four columns, instead of the three columns appearing when the dynamic display field 155 is collapsed.

FIGS. 5A-5B illustrate a single example of integrating a dynamic display field 155 into a graphical user interface 150 to create a dynamic graphical user interface 150. Numerous other uses of the dynamic display field 155 can be used in graphical user interfaces 150 to effect various results.

FIGS. 7-26 illustrate various screenshots of three-column graphical user interfaces 150 that can provided by some embodiments of the display system 100. FIGS. 27-57 illustrate various screenshots of four-column graphical user interfaces 150 that can provided by some embodiments of the display system 100. For example, the graphical user interfaces 150 in FIGS. 7-26 can represent a collapsed state of the dynamic display field 155, while those in FIGS. 27-57 can represent an expanded state of the dynamic display field 155 having an increased number of columns.

Figure 6:
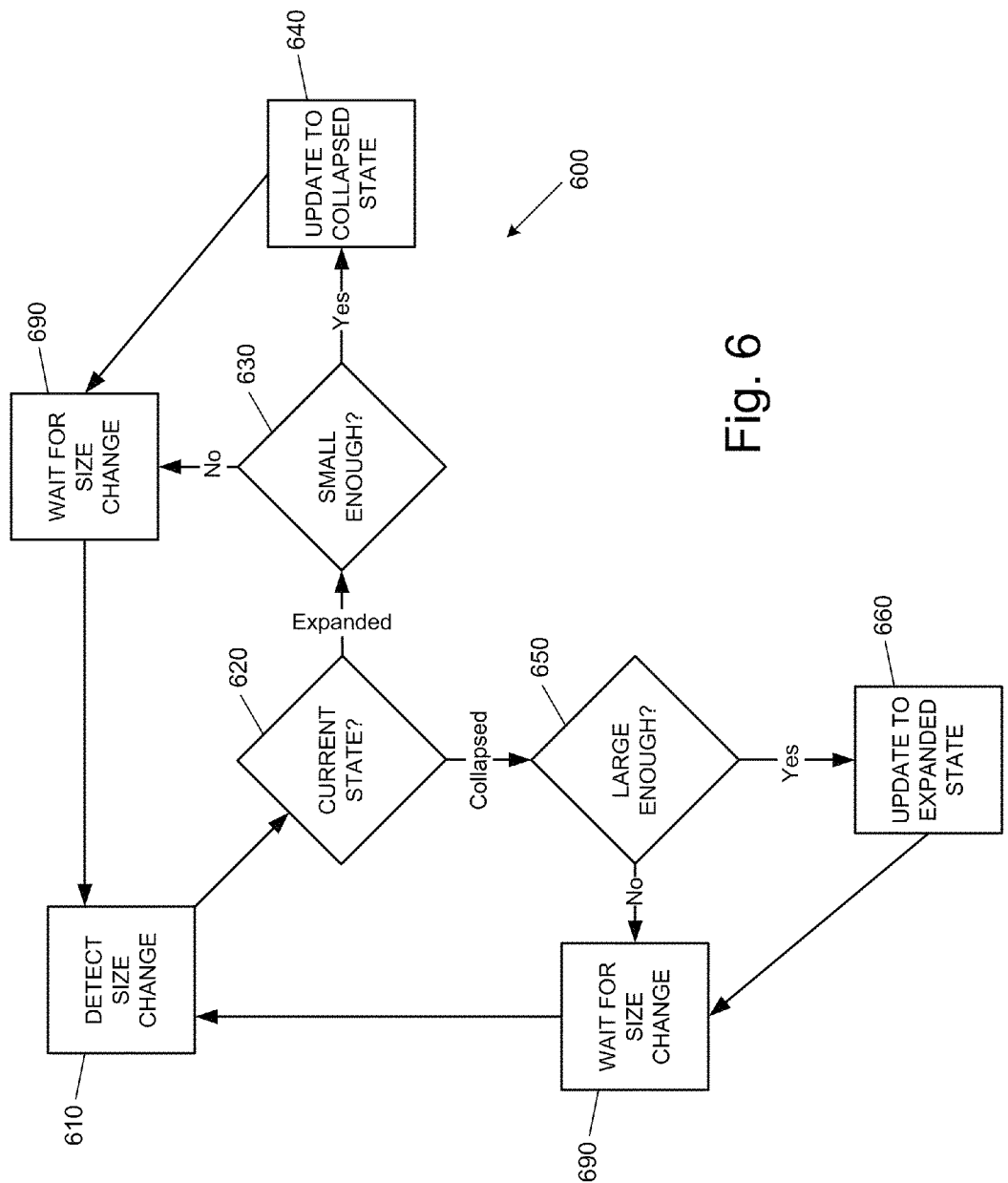
FIG. 6 illustrates a method of updating the current state of the dynamic display field of the graphical user interface, according to an exemplary embodiment of the present invention.
Figure 7:
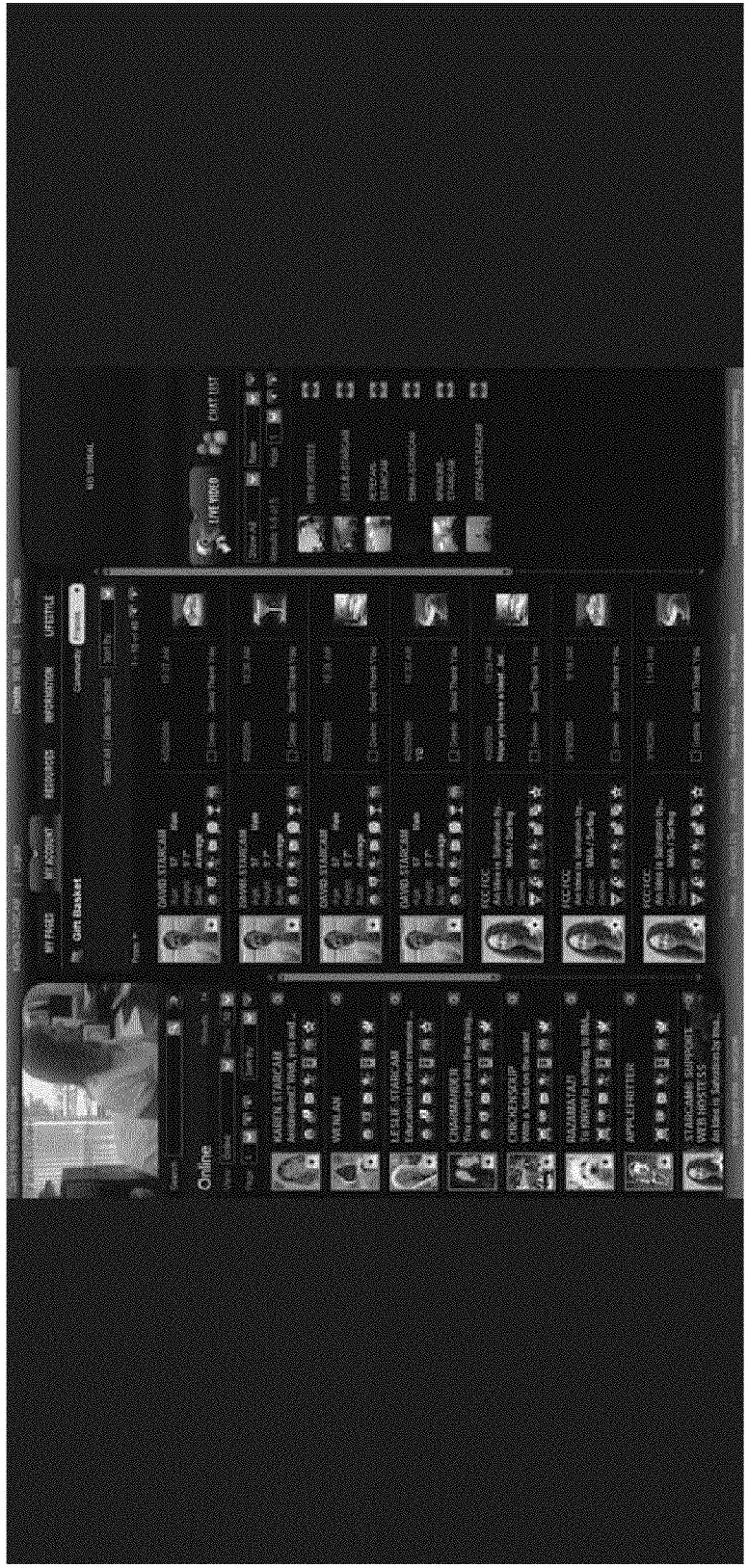
FIGS. 7-26 illustrate various screenshots of three-column graphical user interfaces that can provided by the display system, according to an exemplary embodiment of the present invention.
Figure 8:
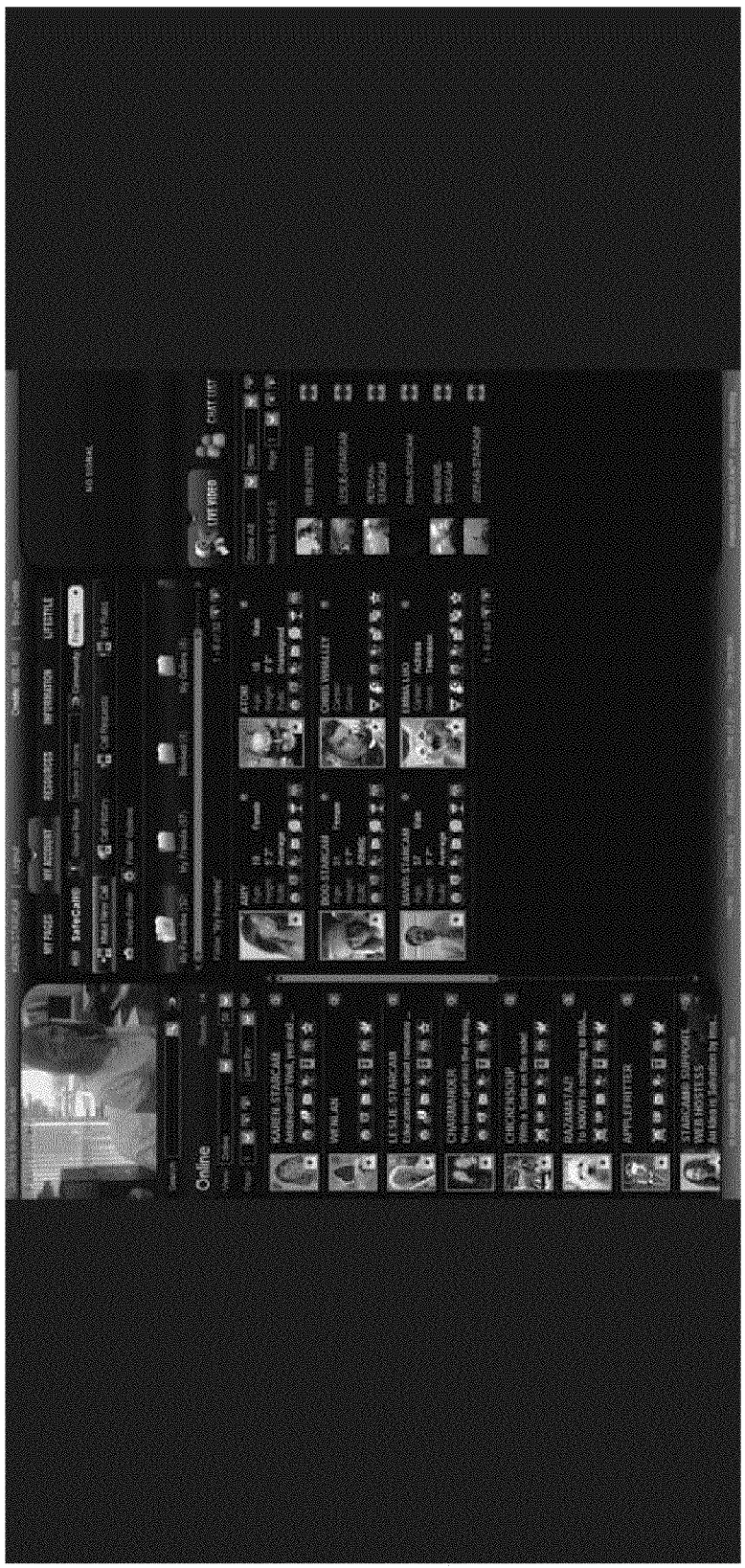
Figure 9:
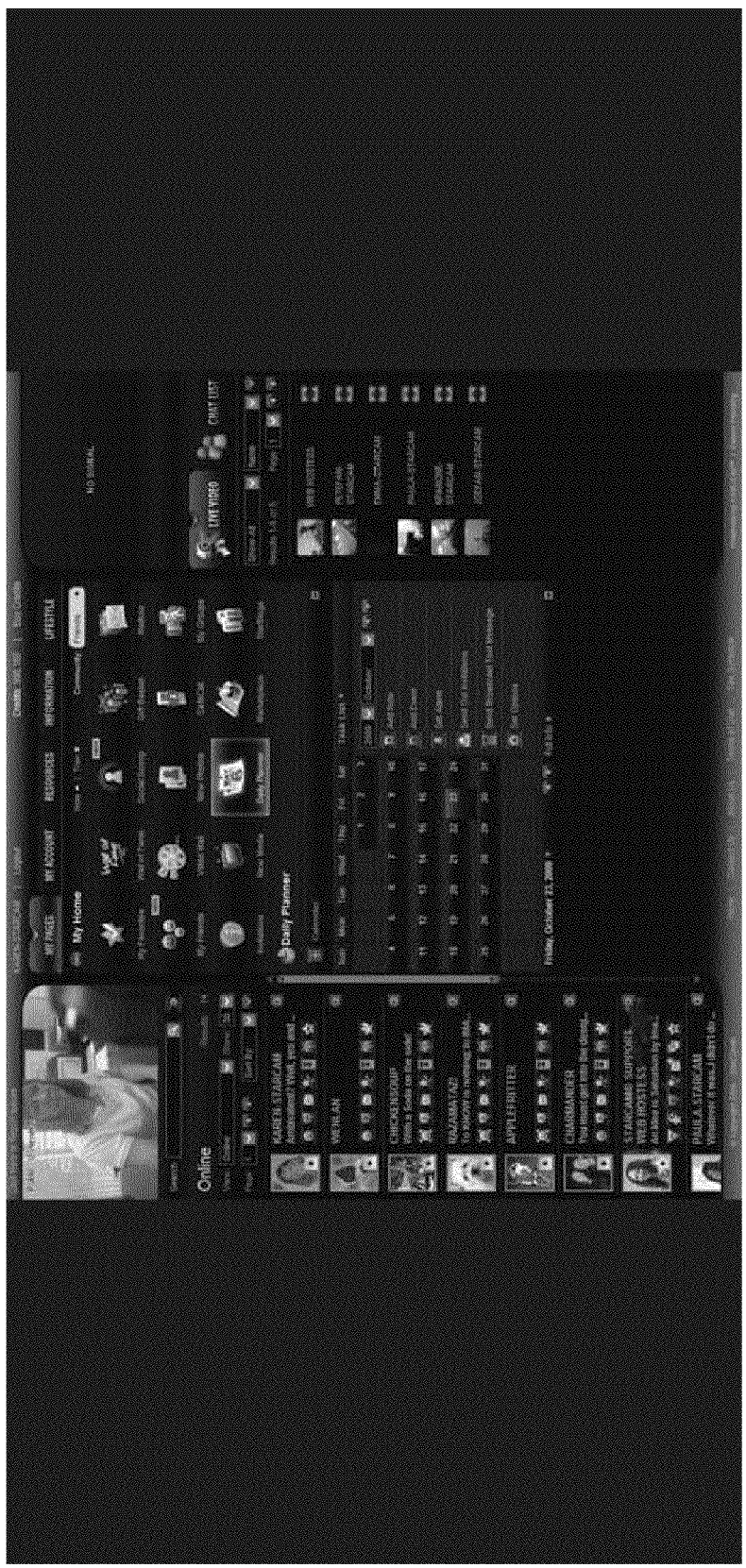
Figure 10:
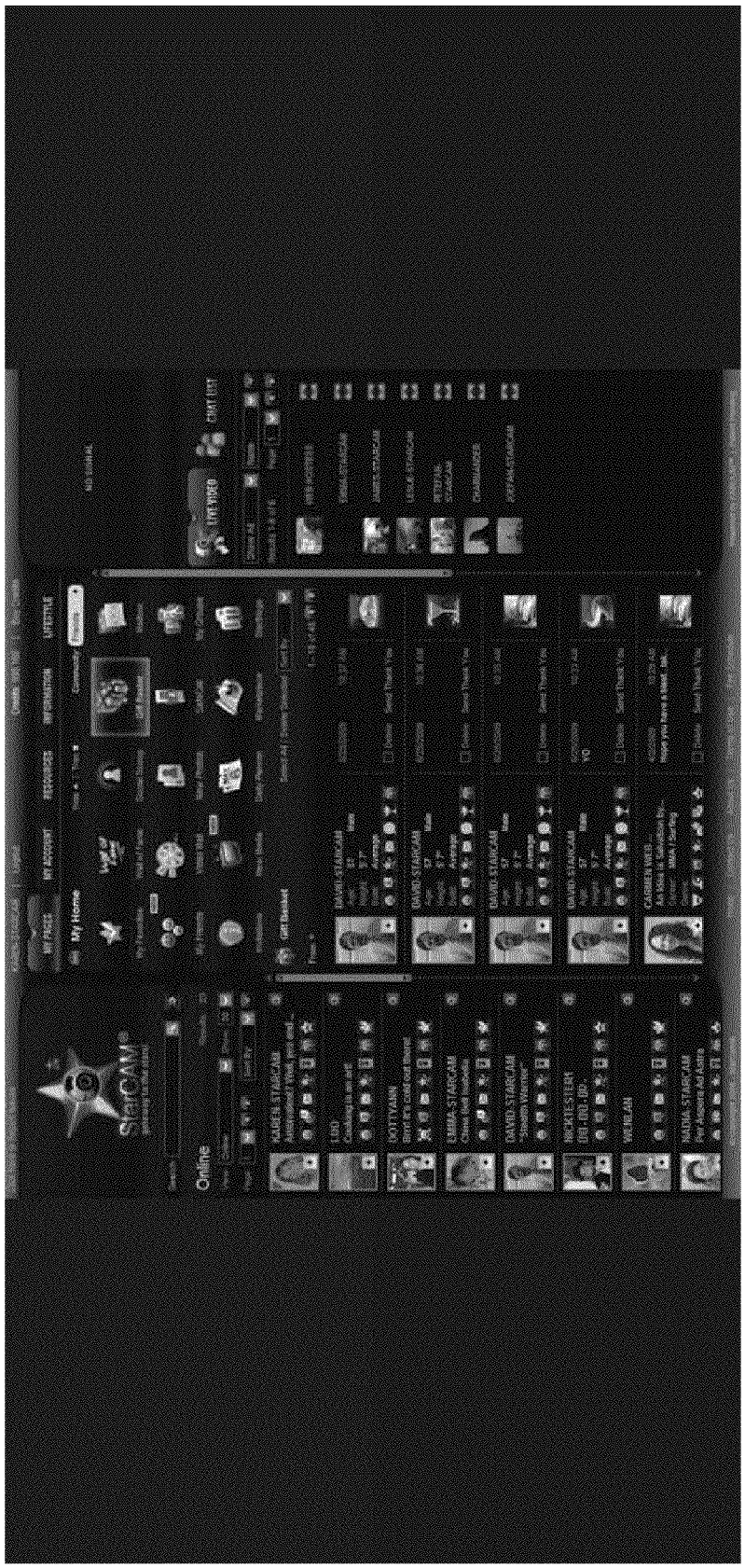
Figure 11:
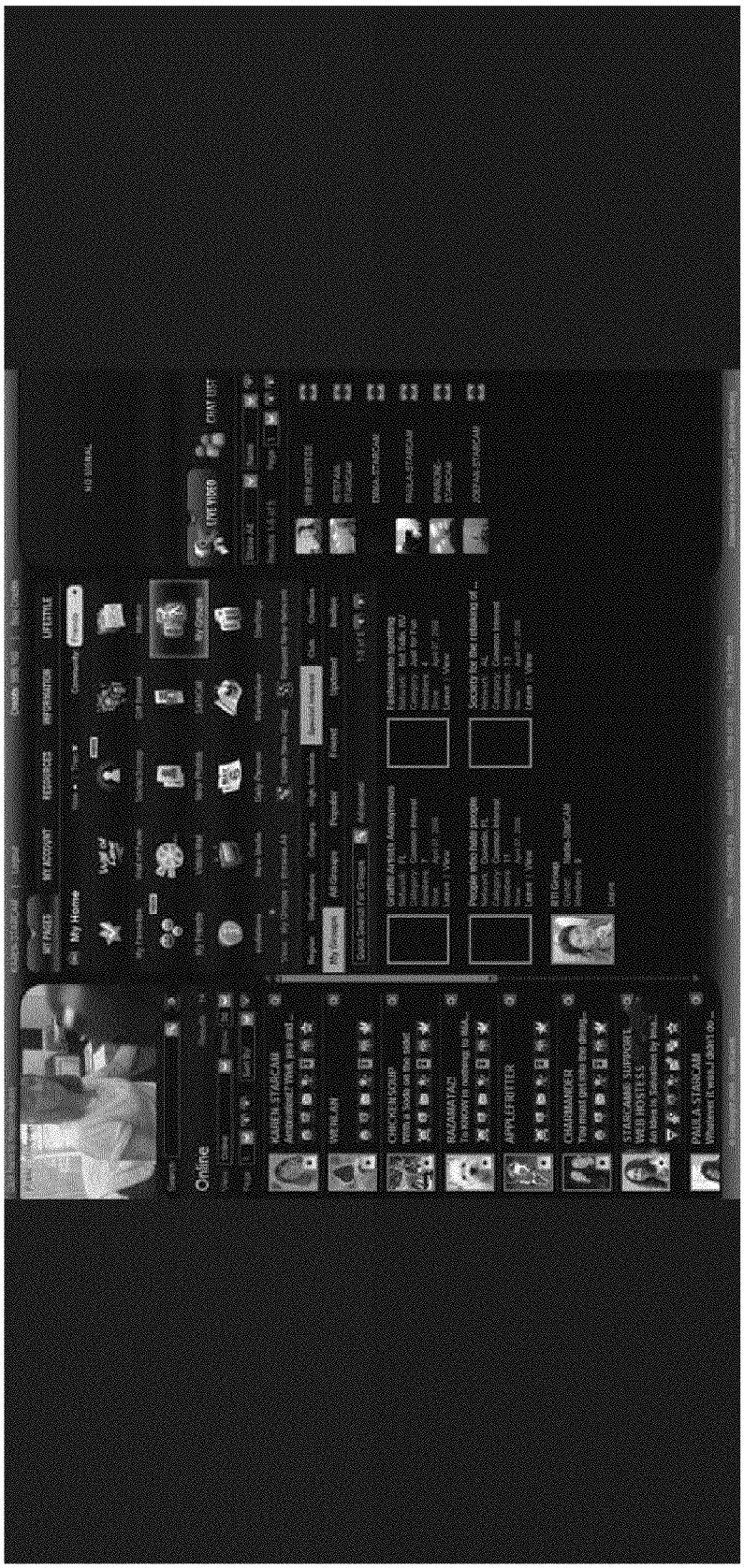
Figure 12:
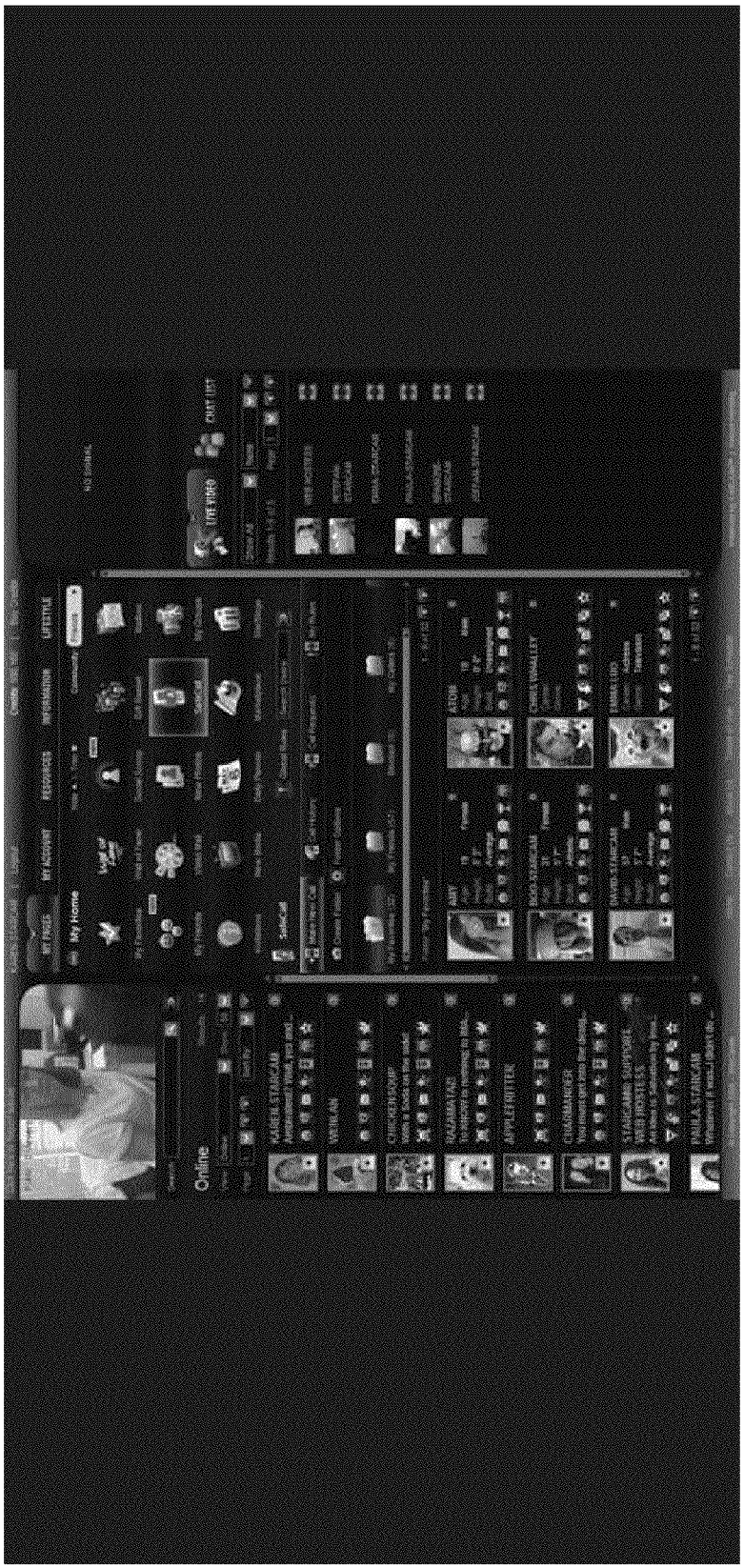
Figure 13:
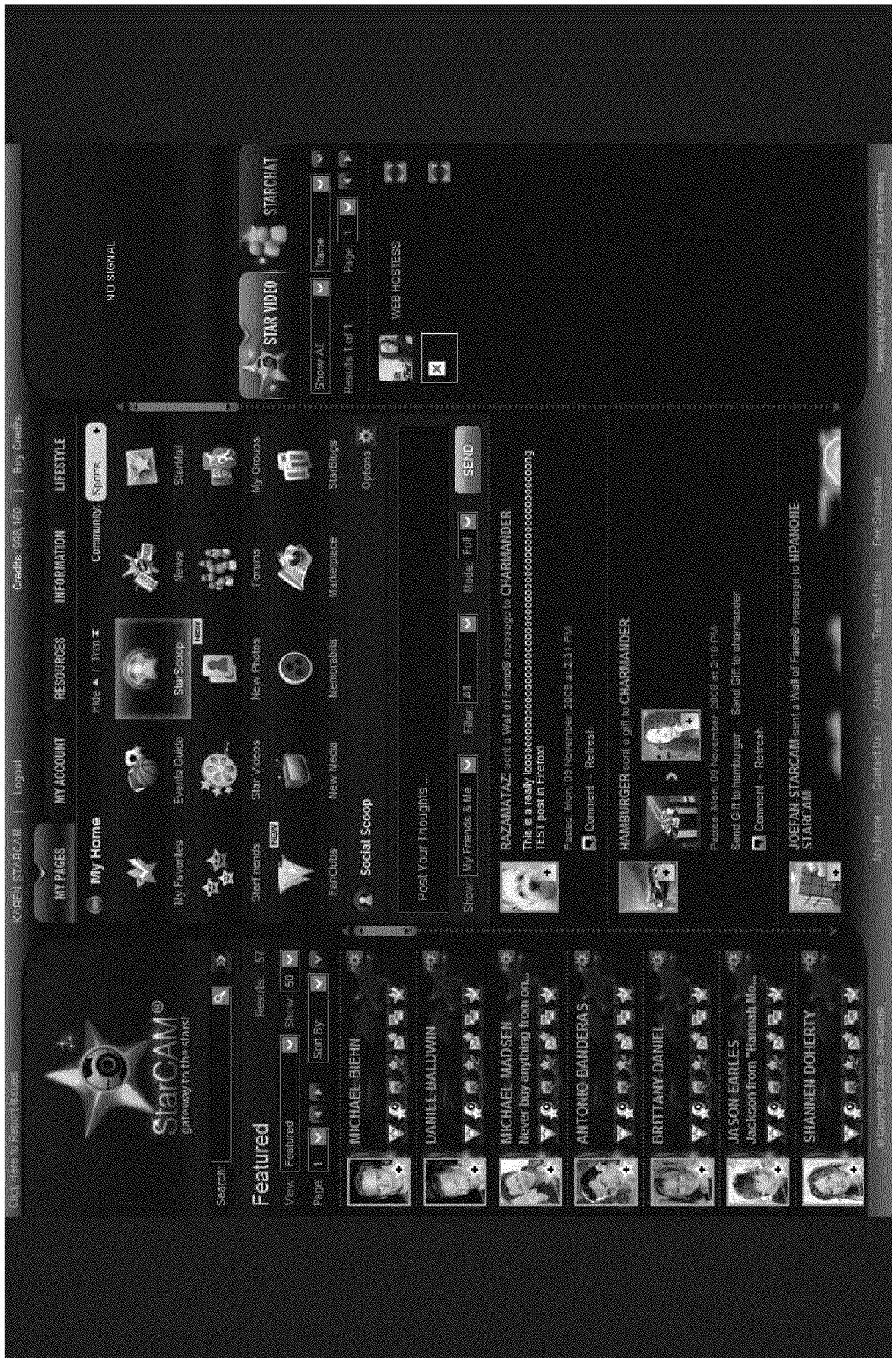
Figure 14:
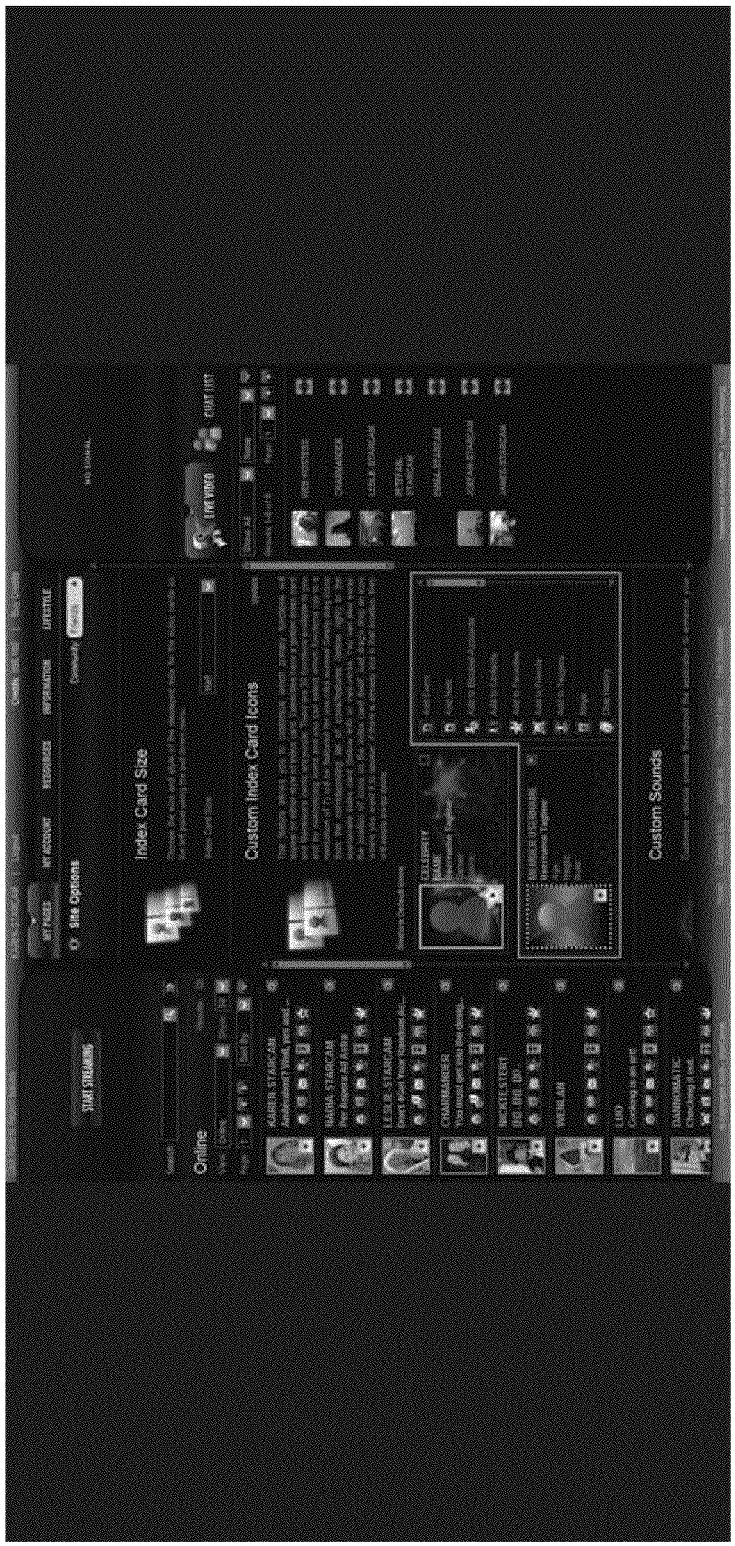
Figure 15:
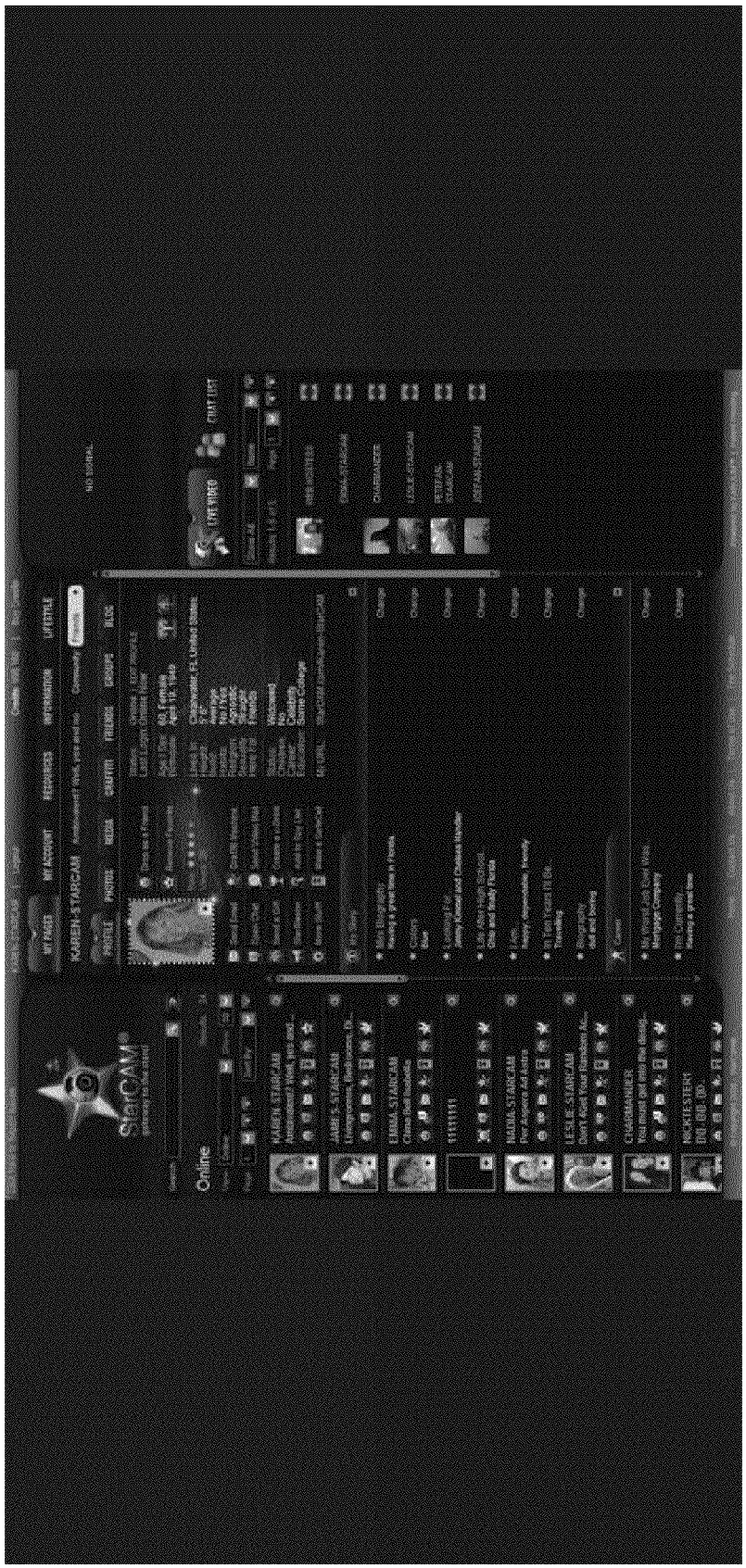
Figure 16:
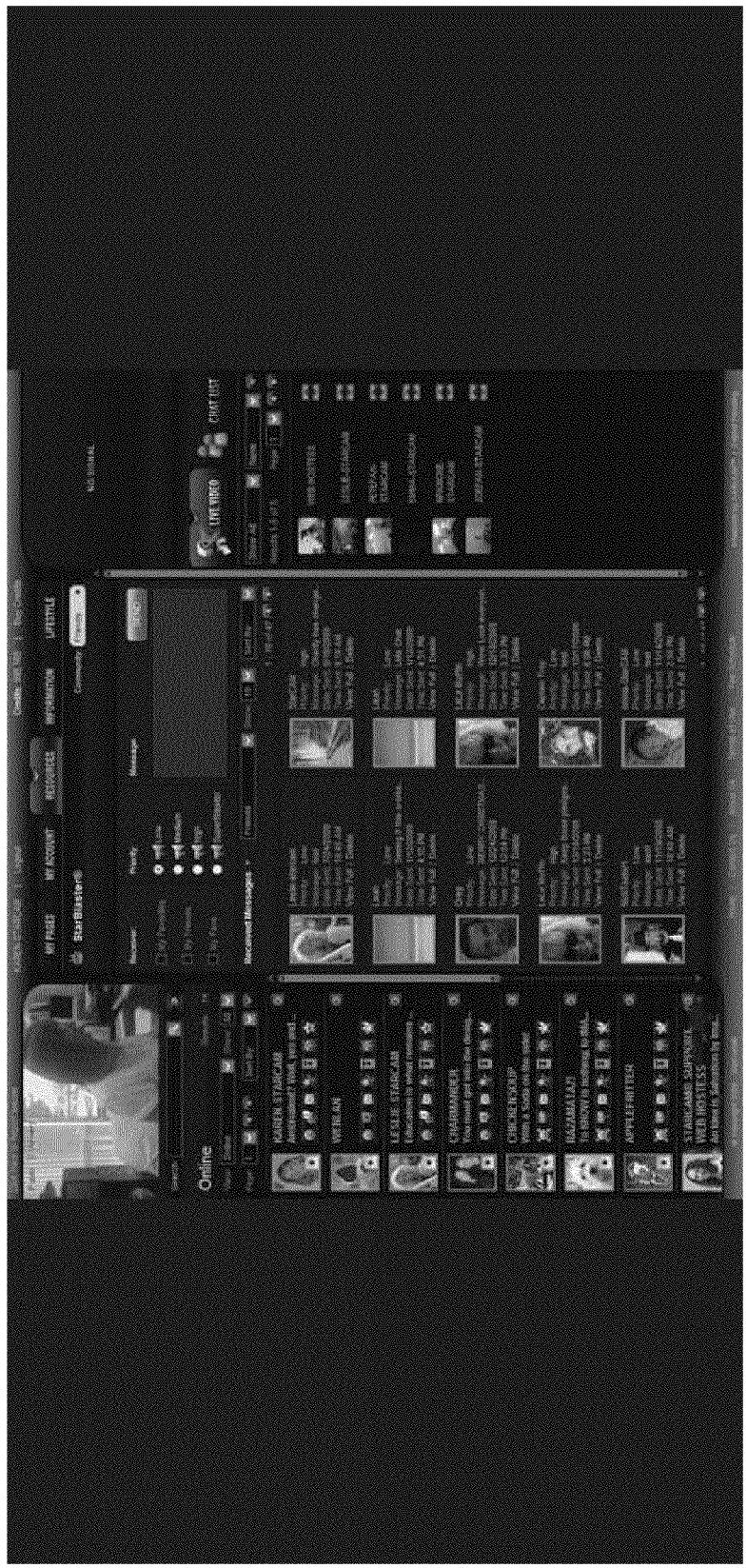
Figure 17:
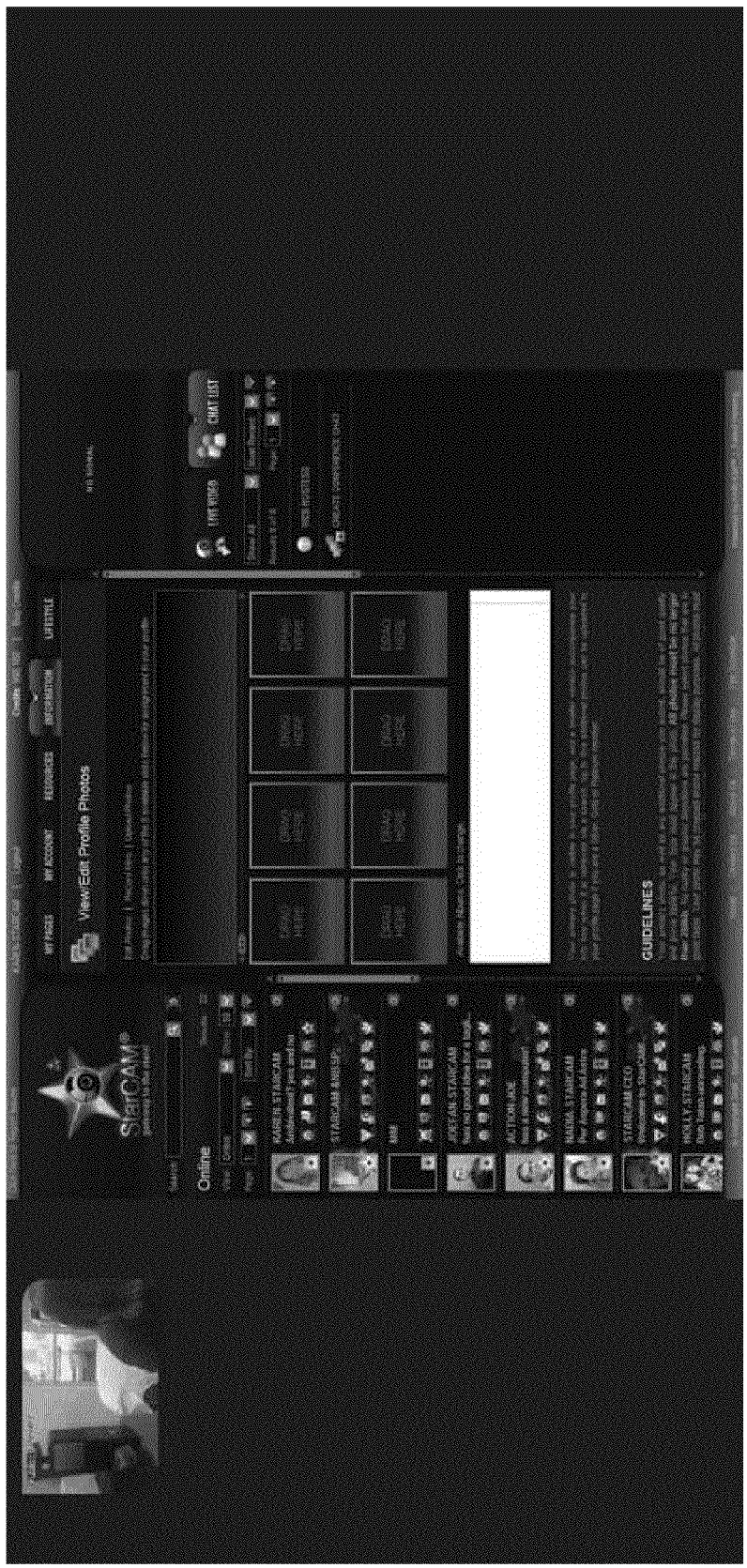
Figure 18:
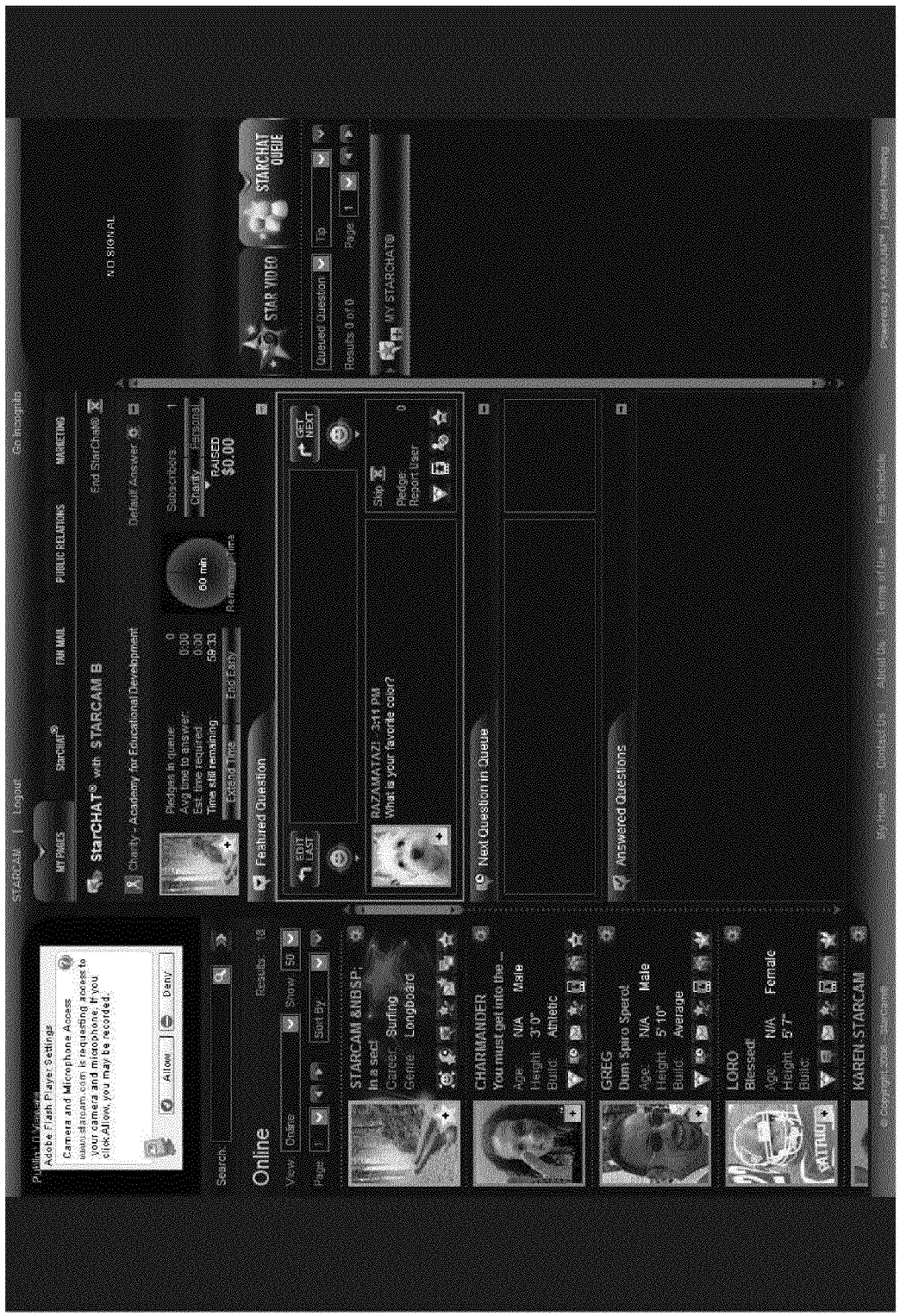
Figure 19:
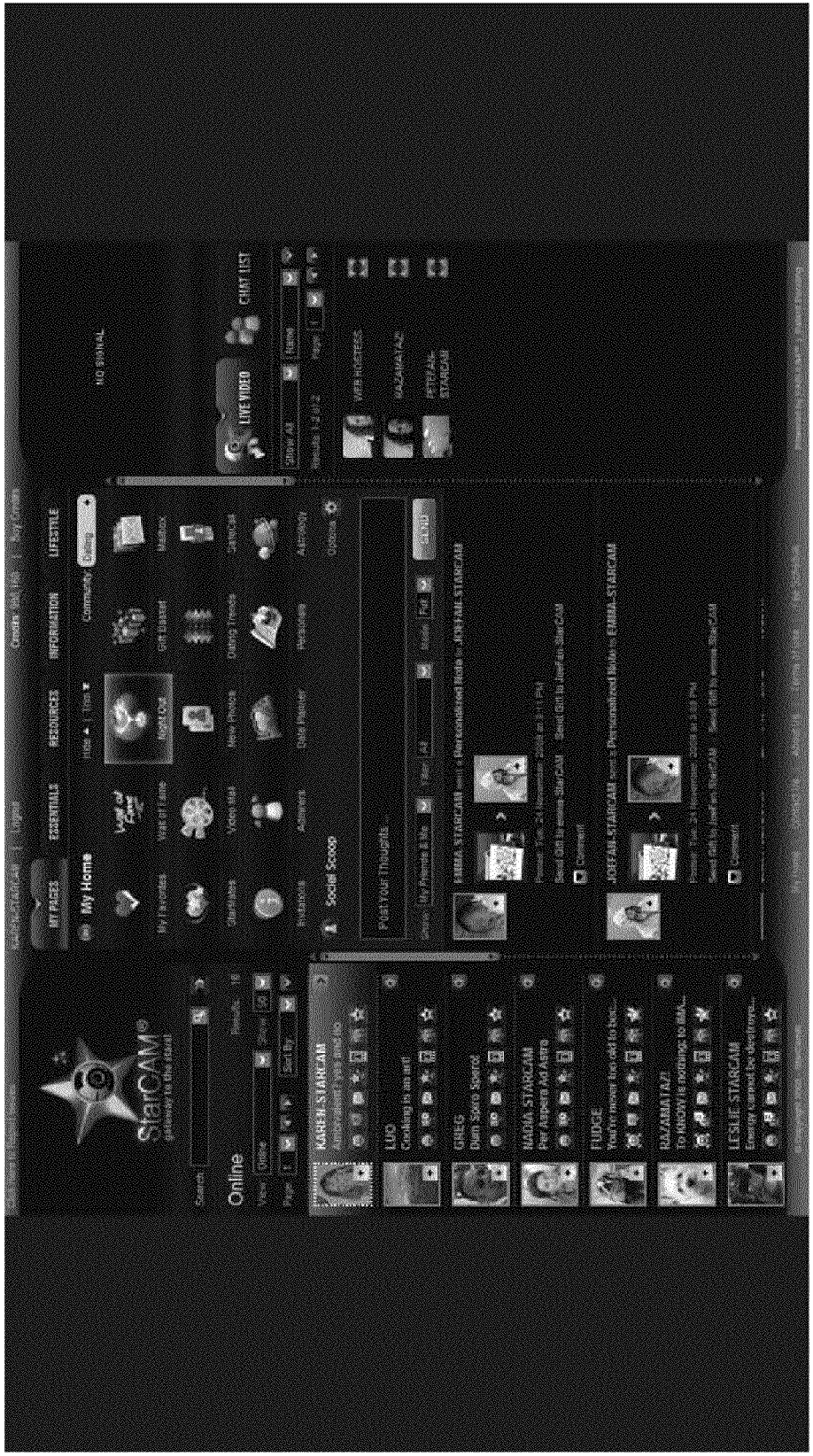
Figure 20:
Figure 21:
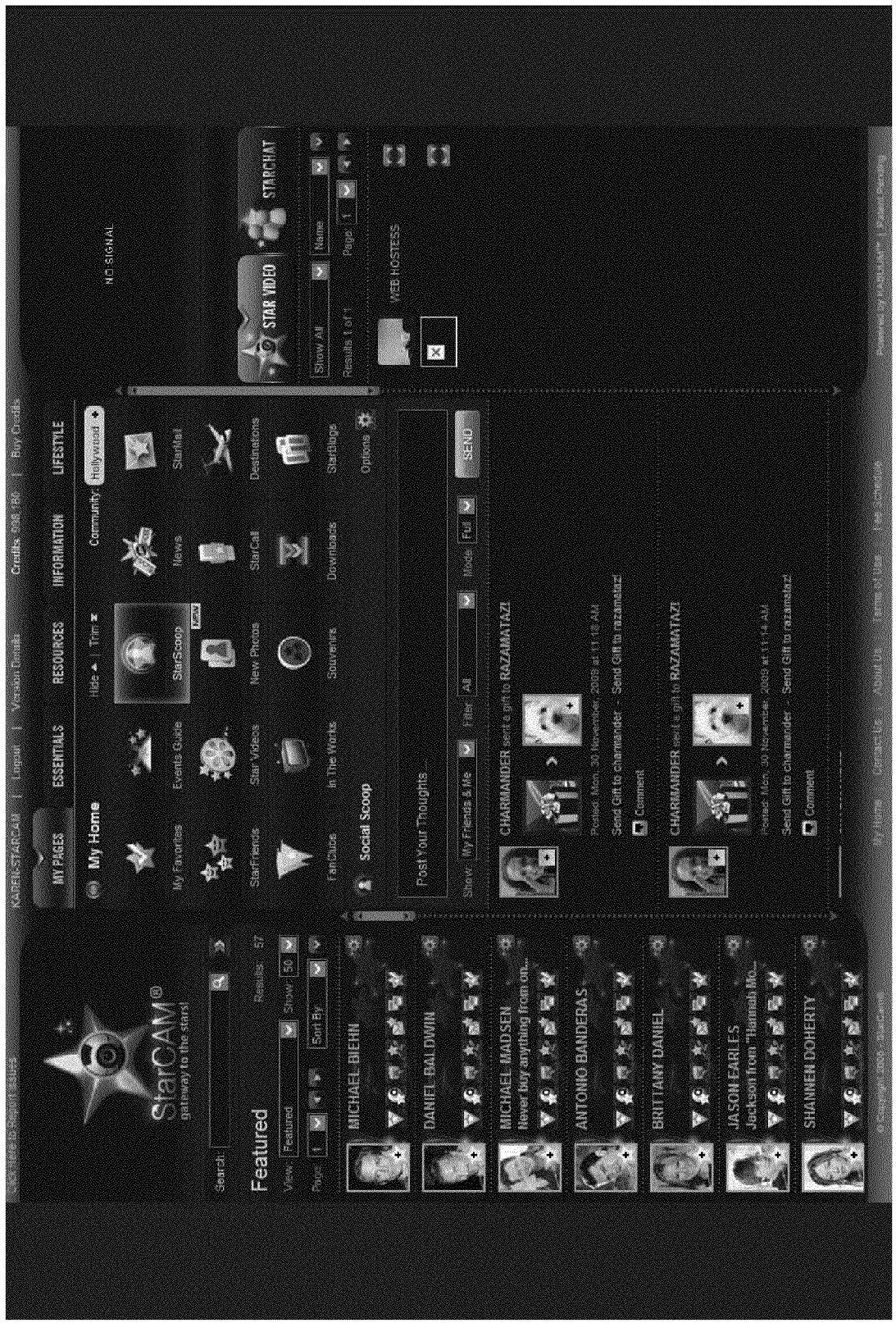
Figure 22:
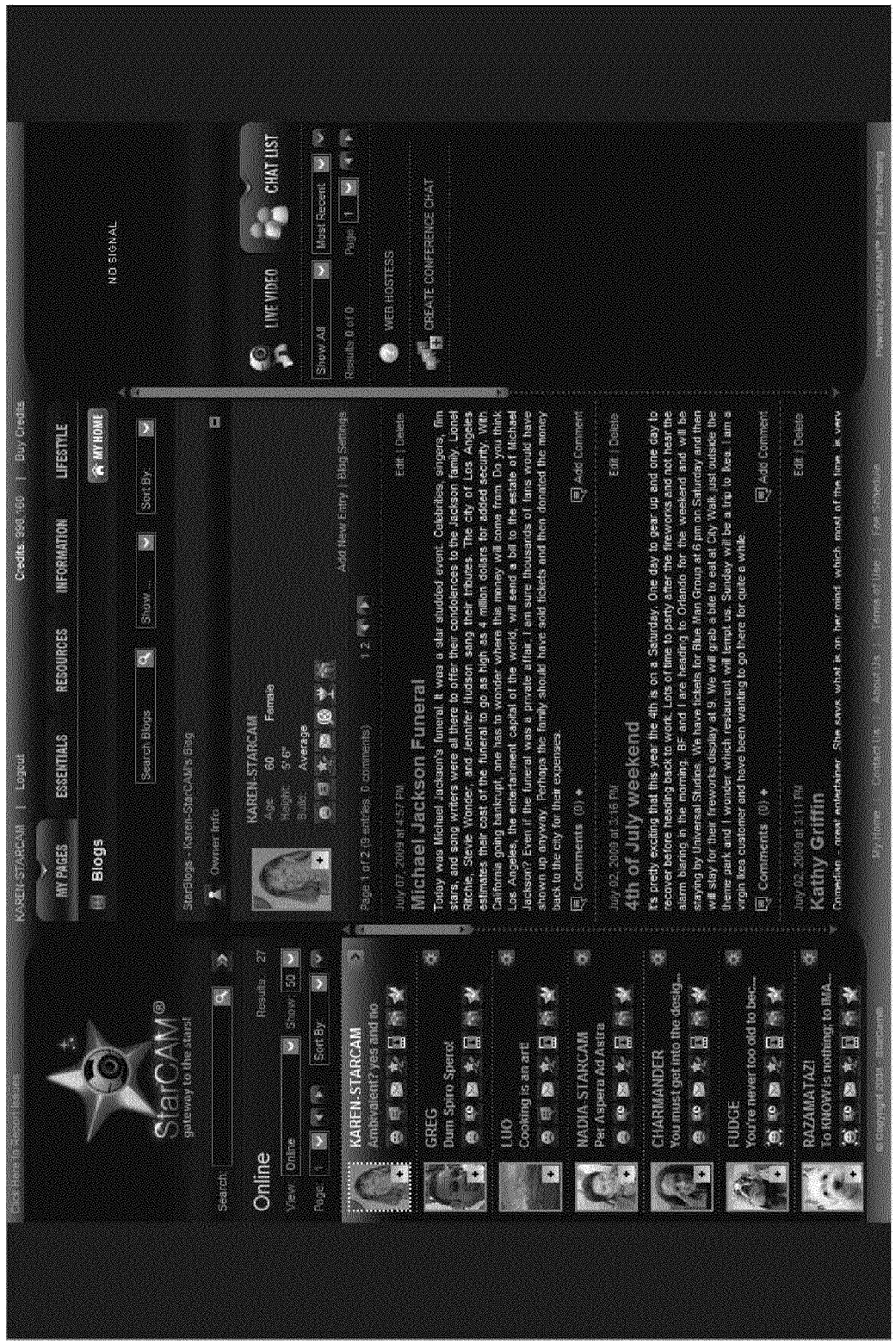
Figure 23:
Figure 24:
Figure 25:
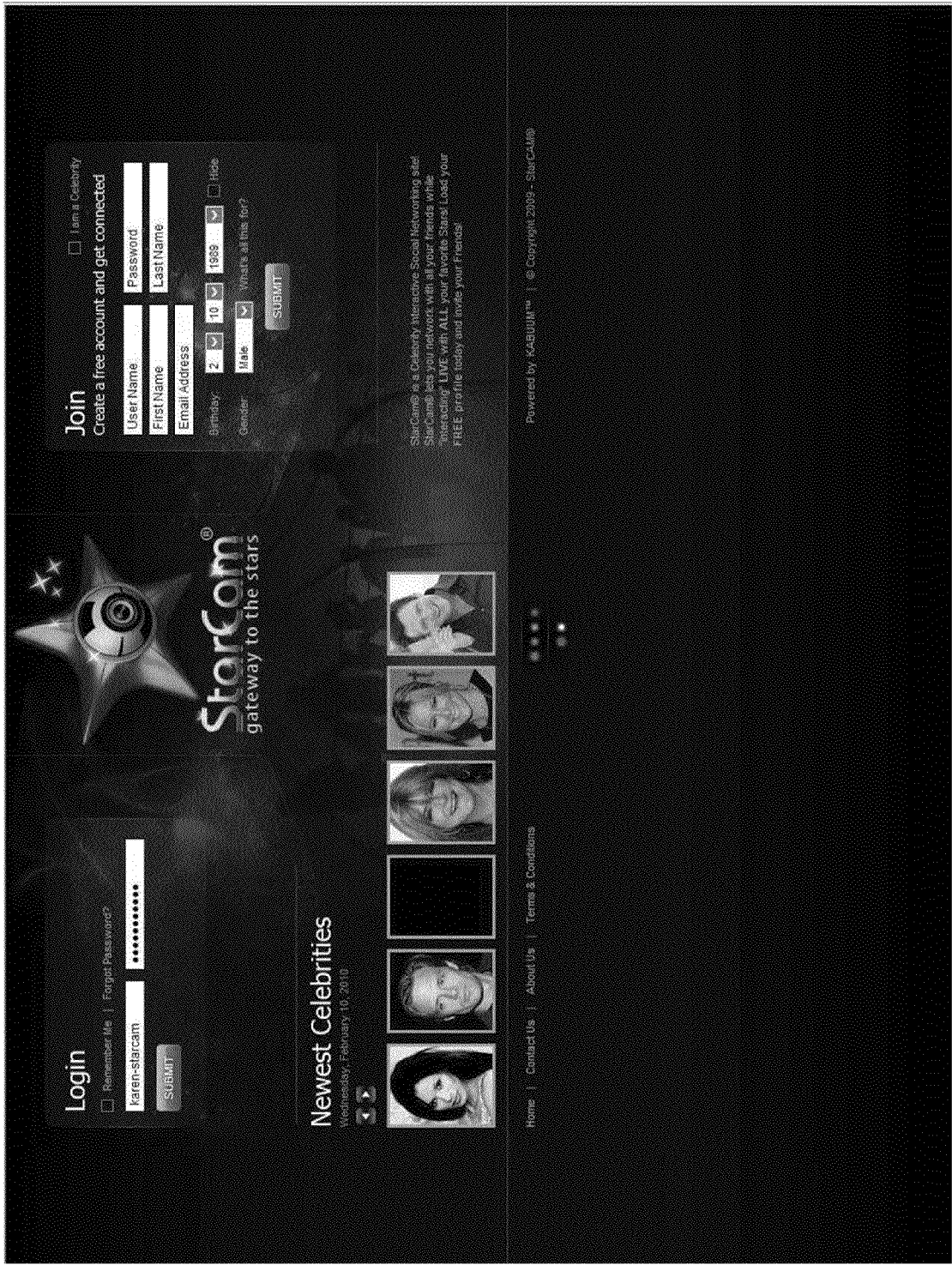
Figure 26:
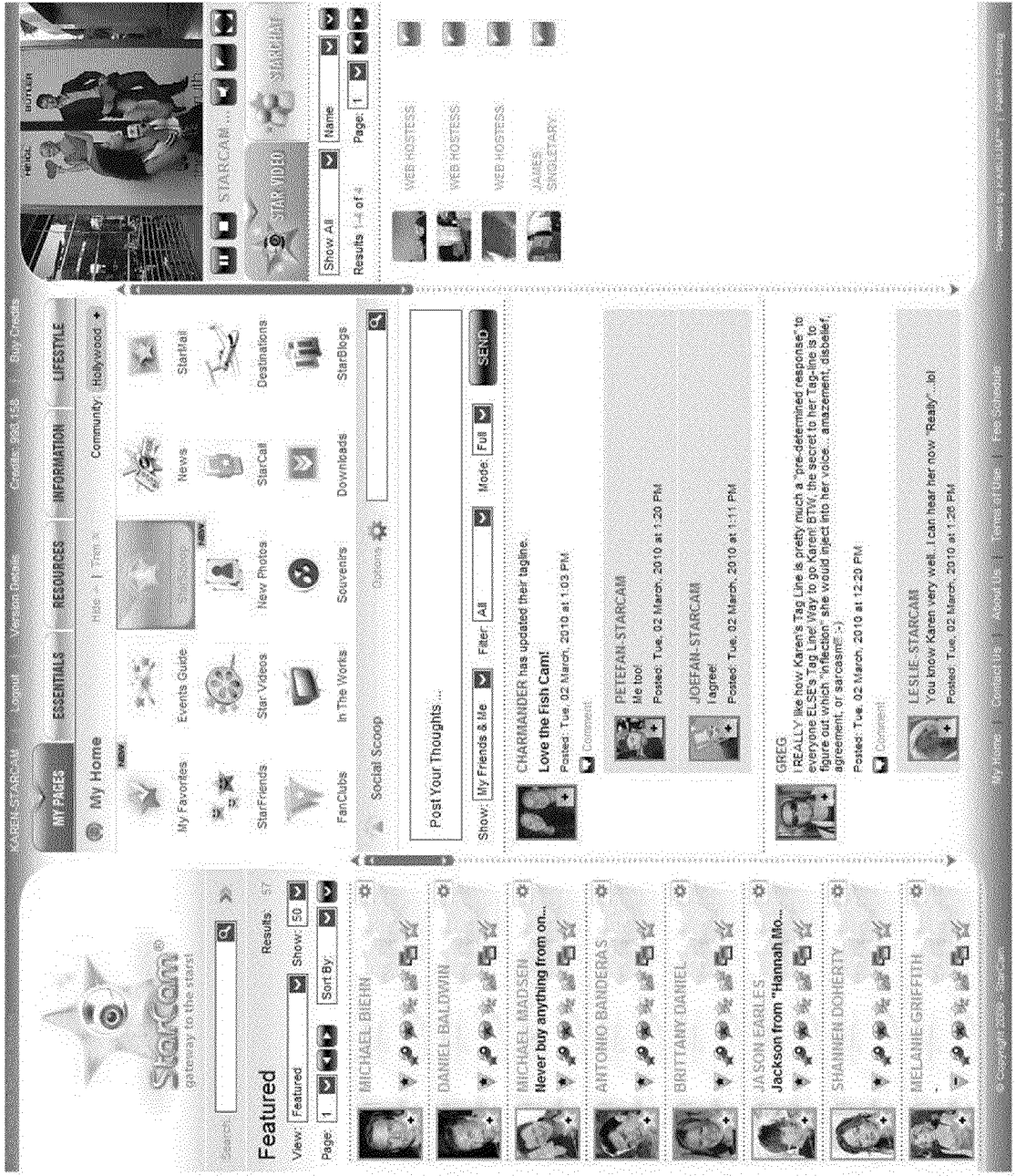
Figure 27:
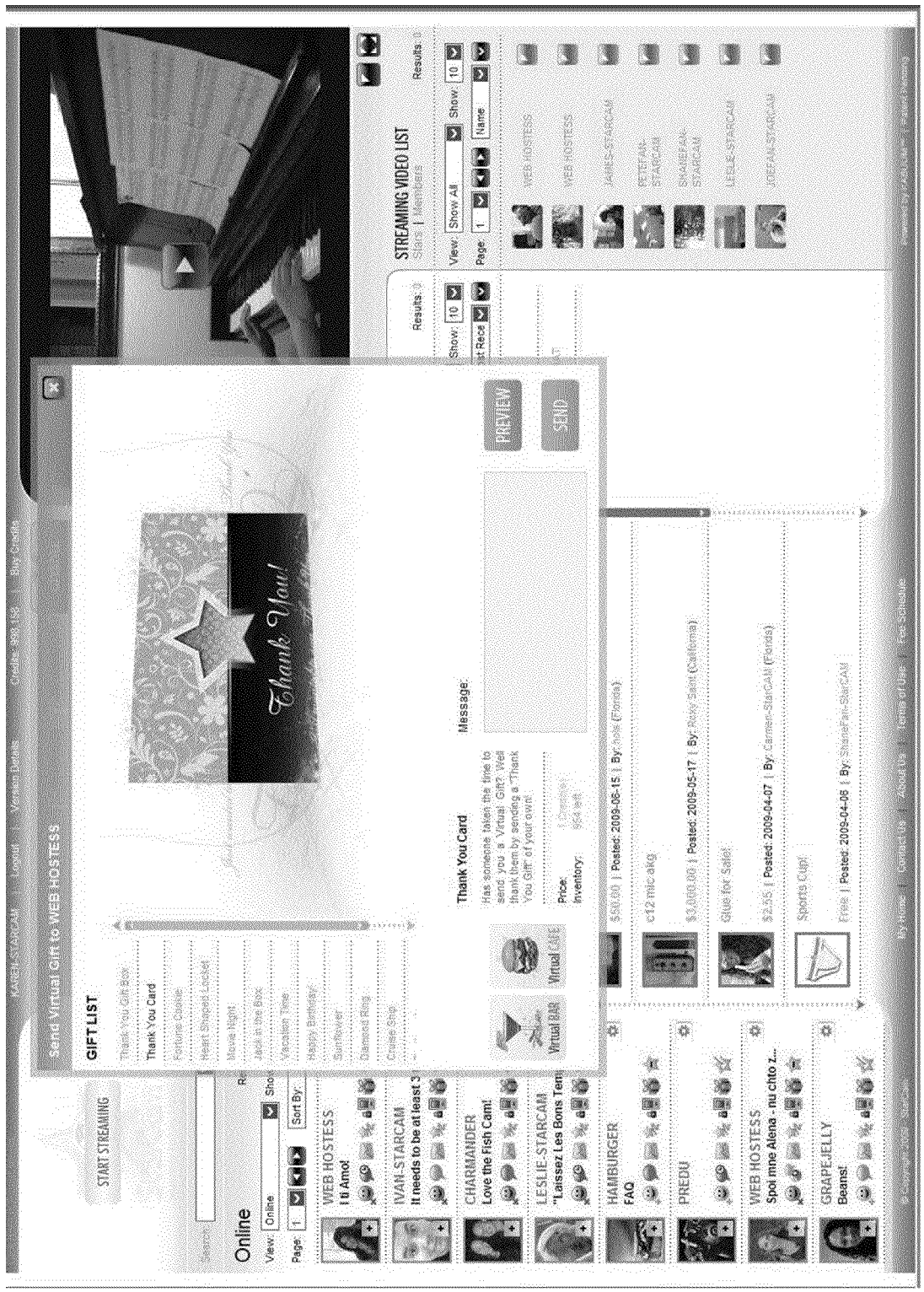
Figure 29:
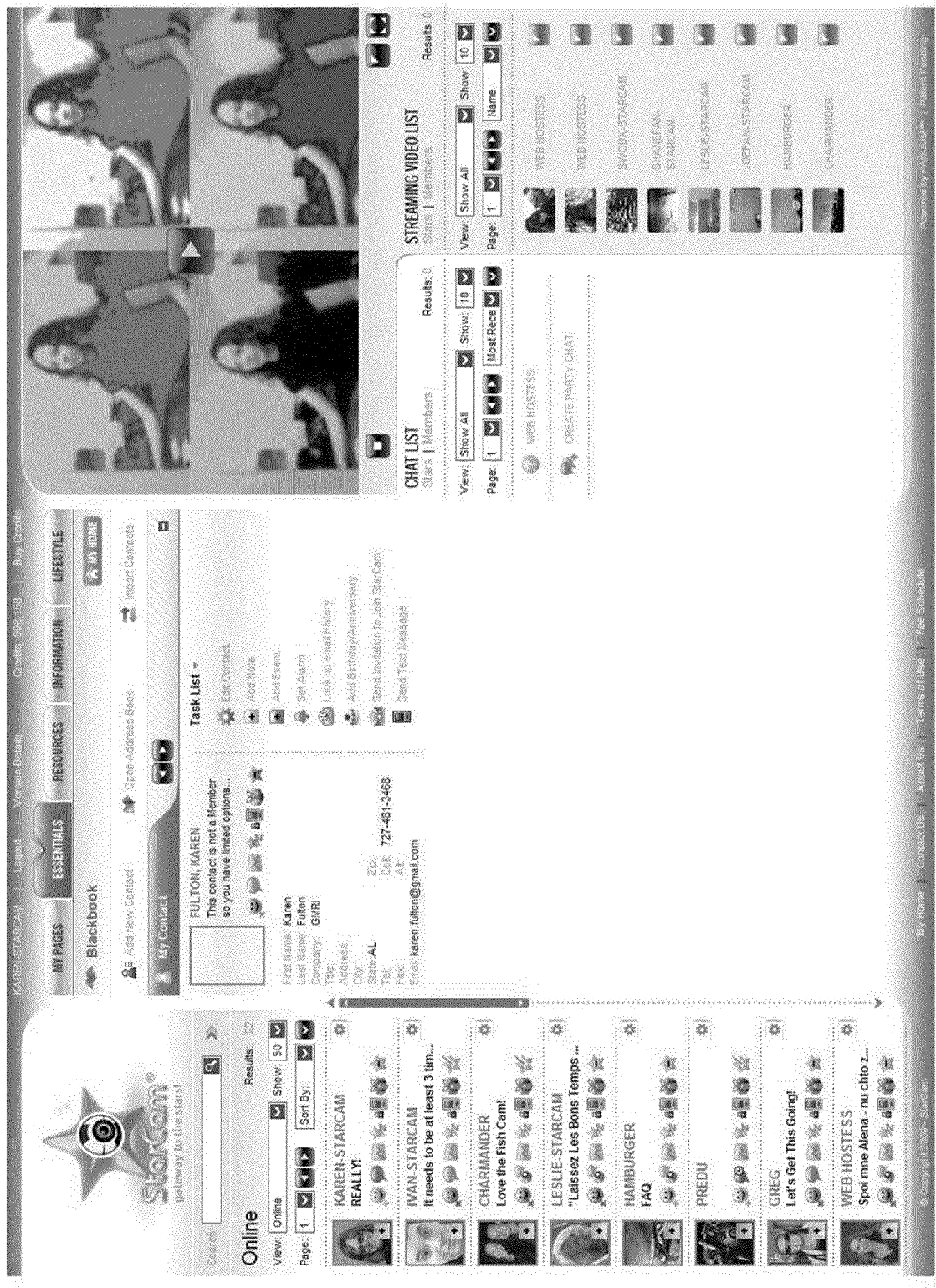
Figure 30:
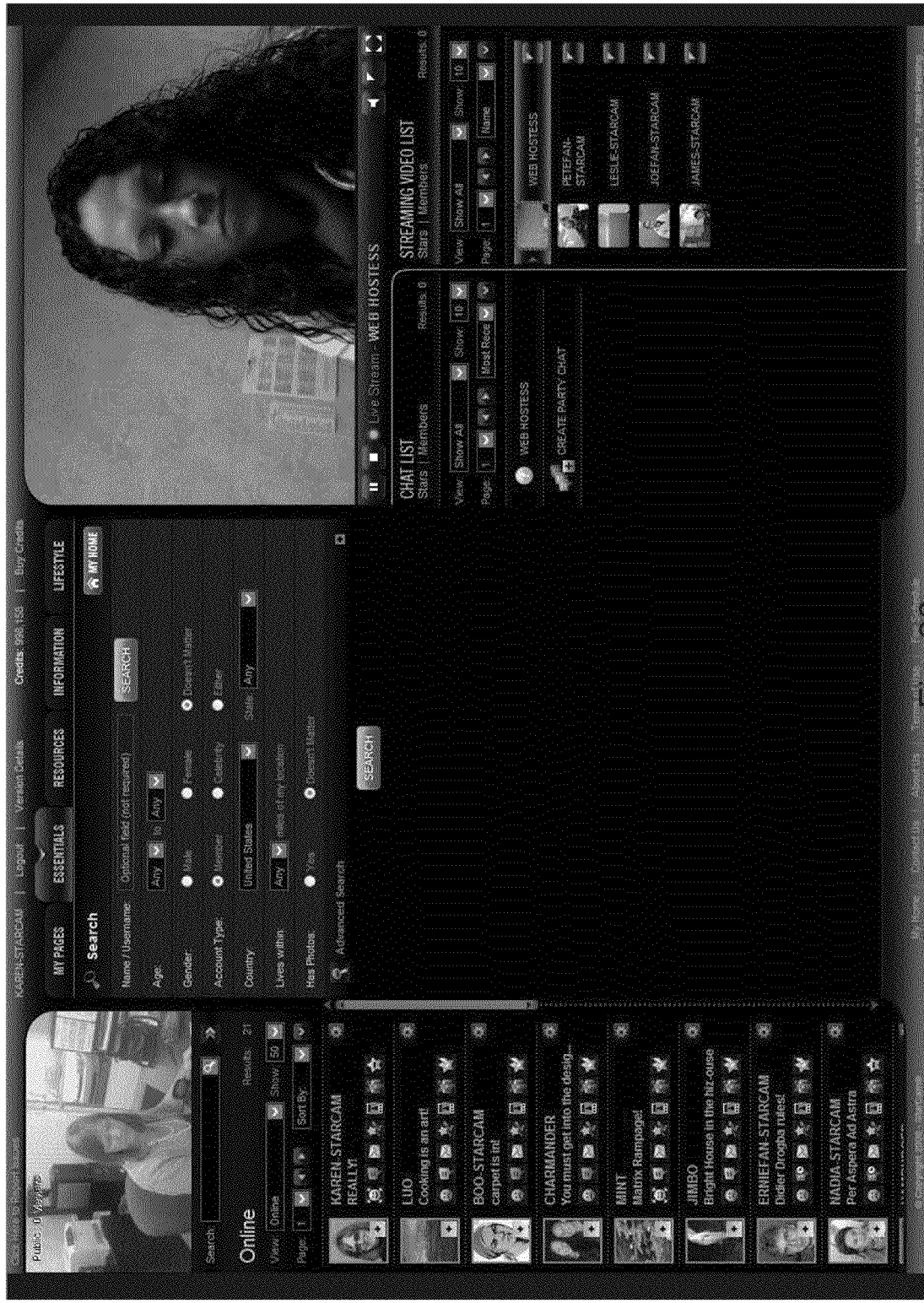
Figure 31:
Figure 32:
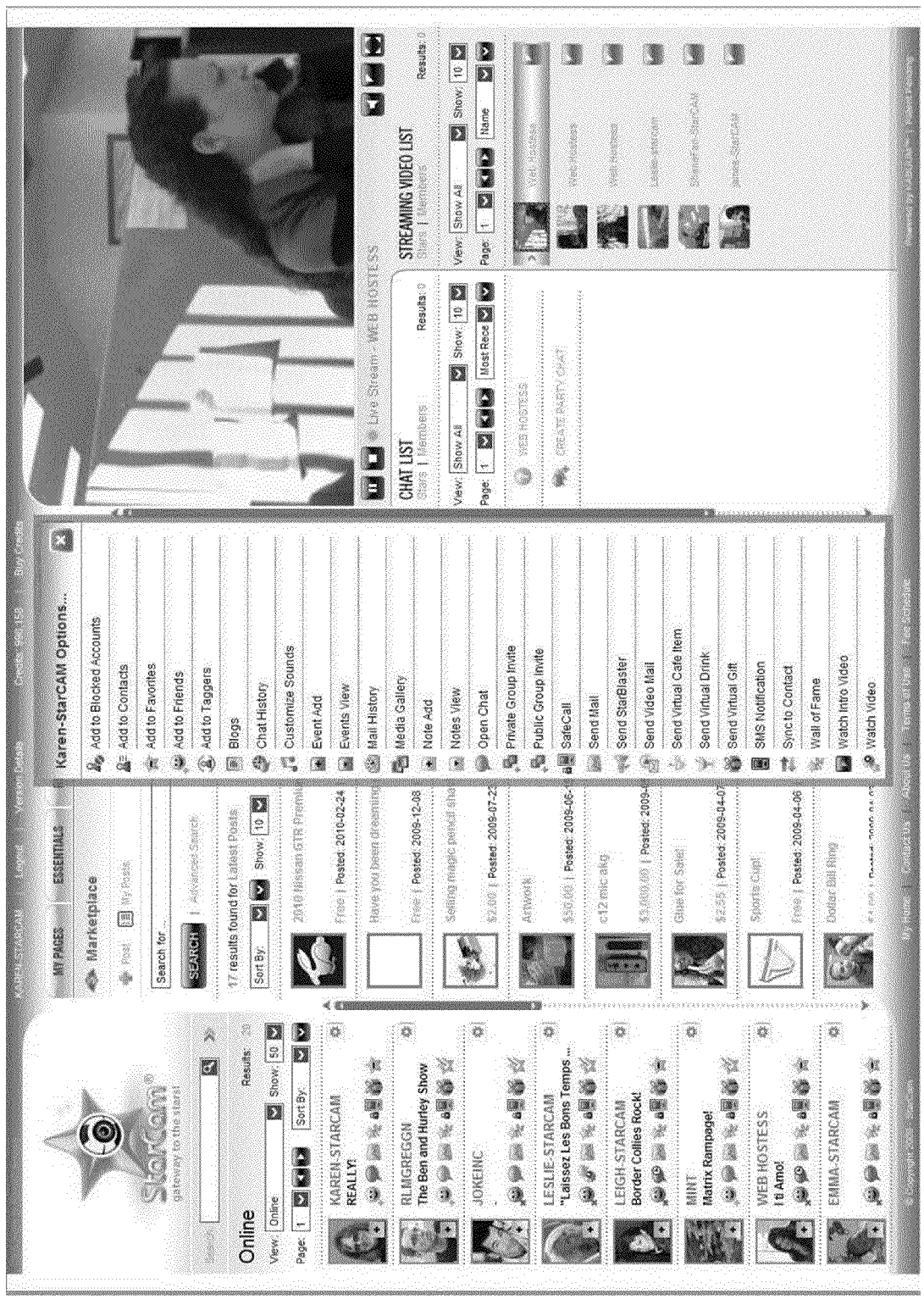
Figure 33:
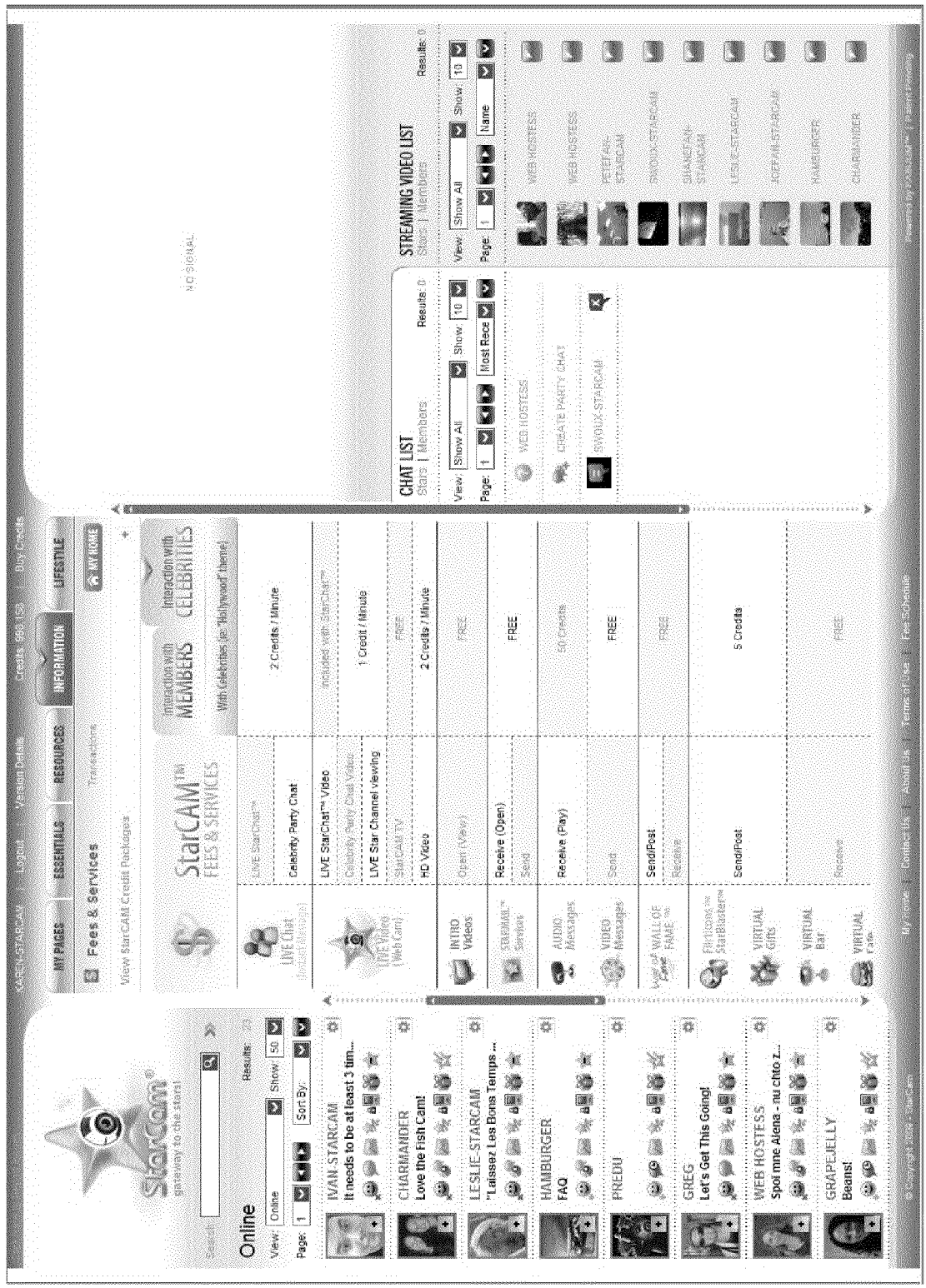
Figure 34:
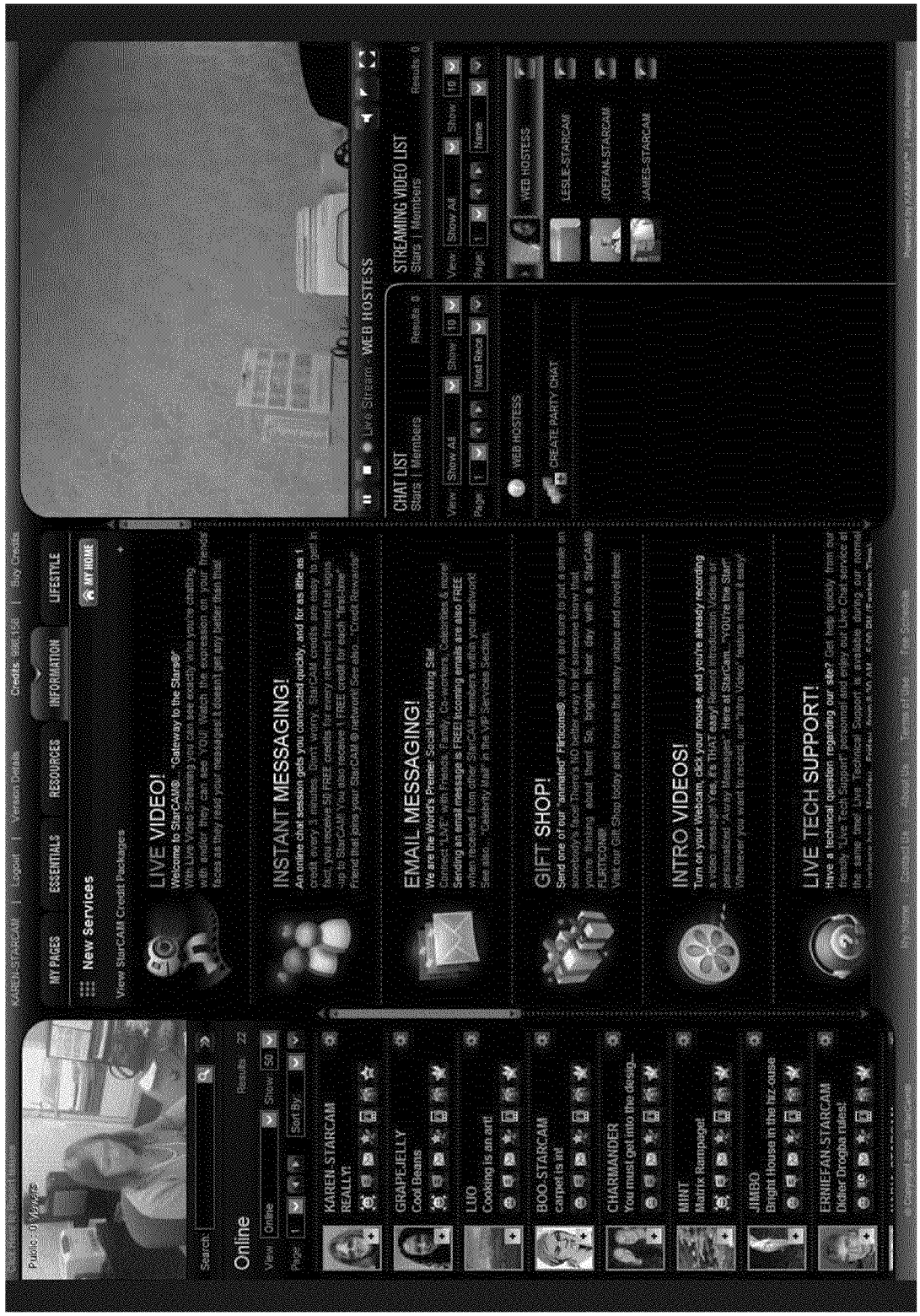
Figure 35:
Figure 36:
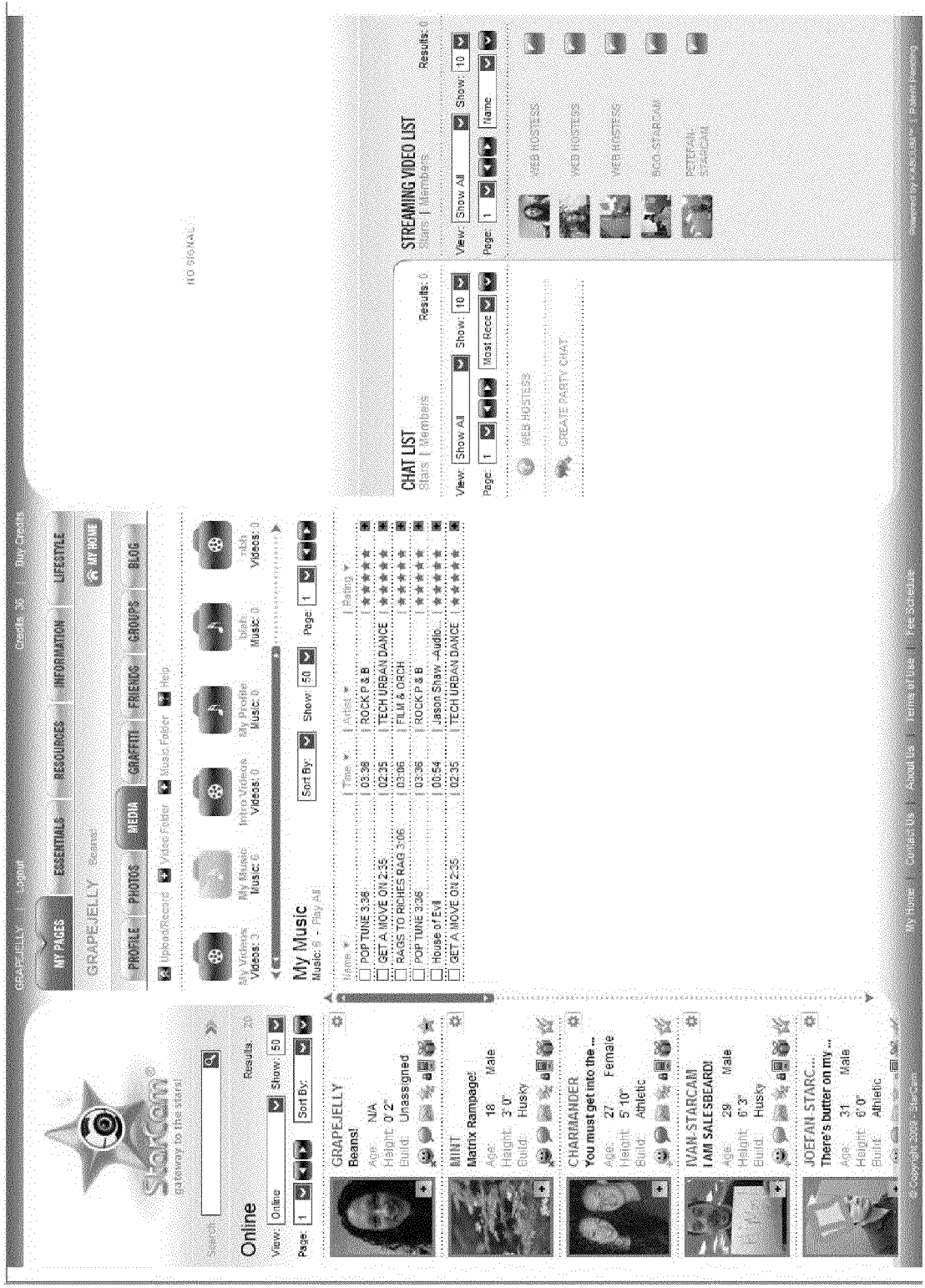
Figure 37:
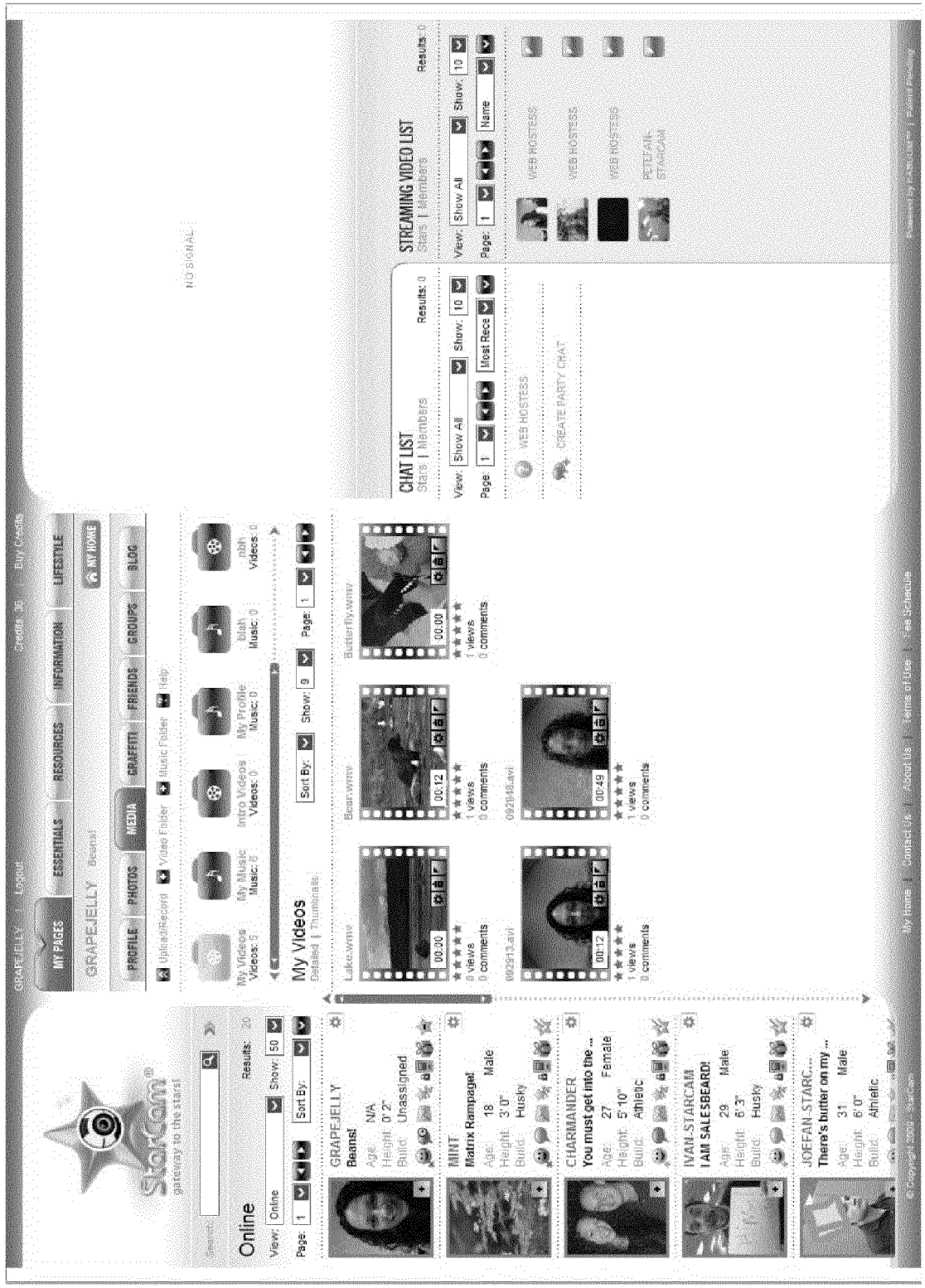
Figure 40:
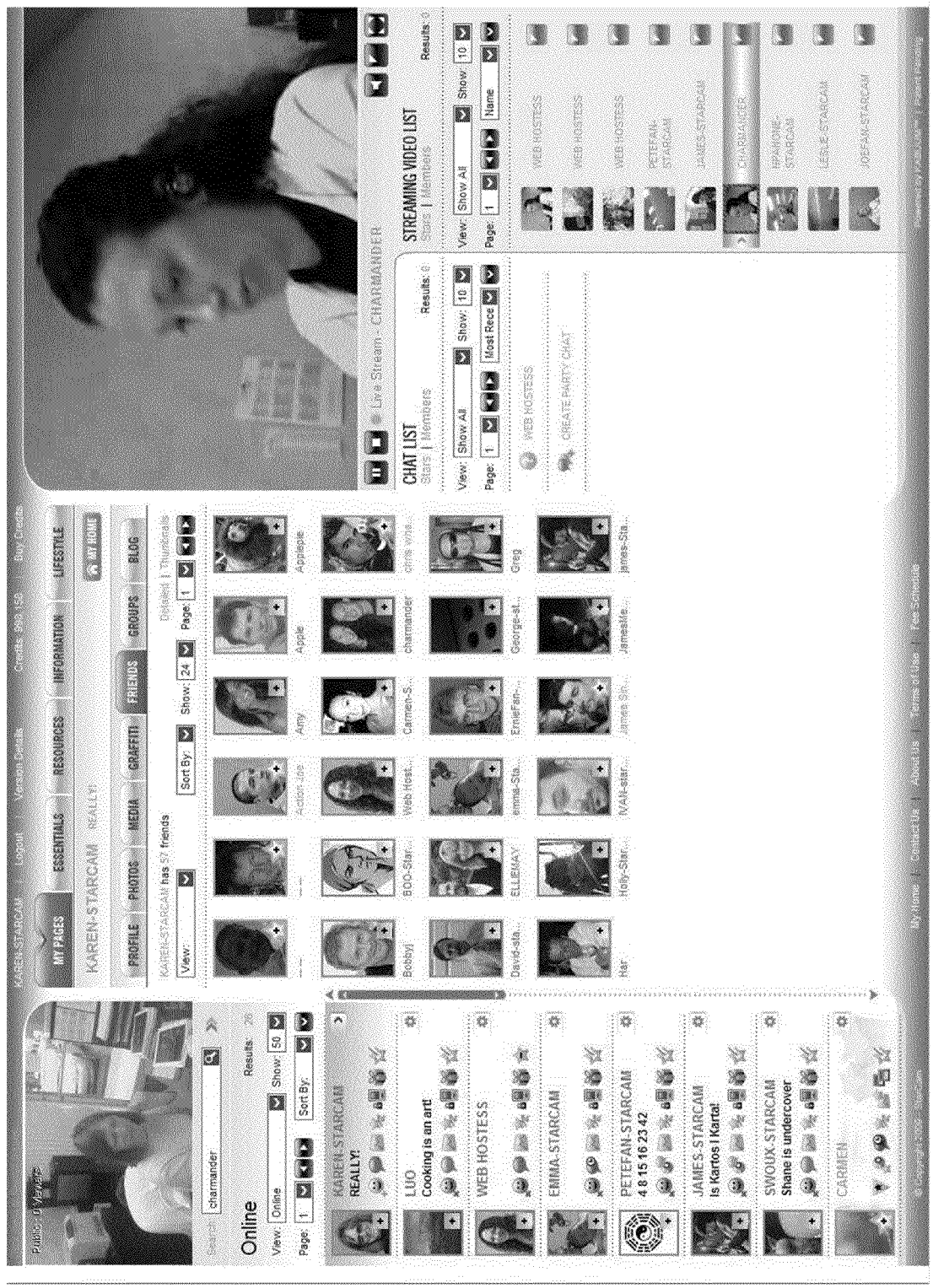
Figure 41:
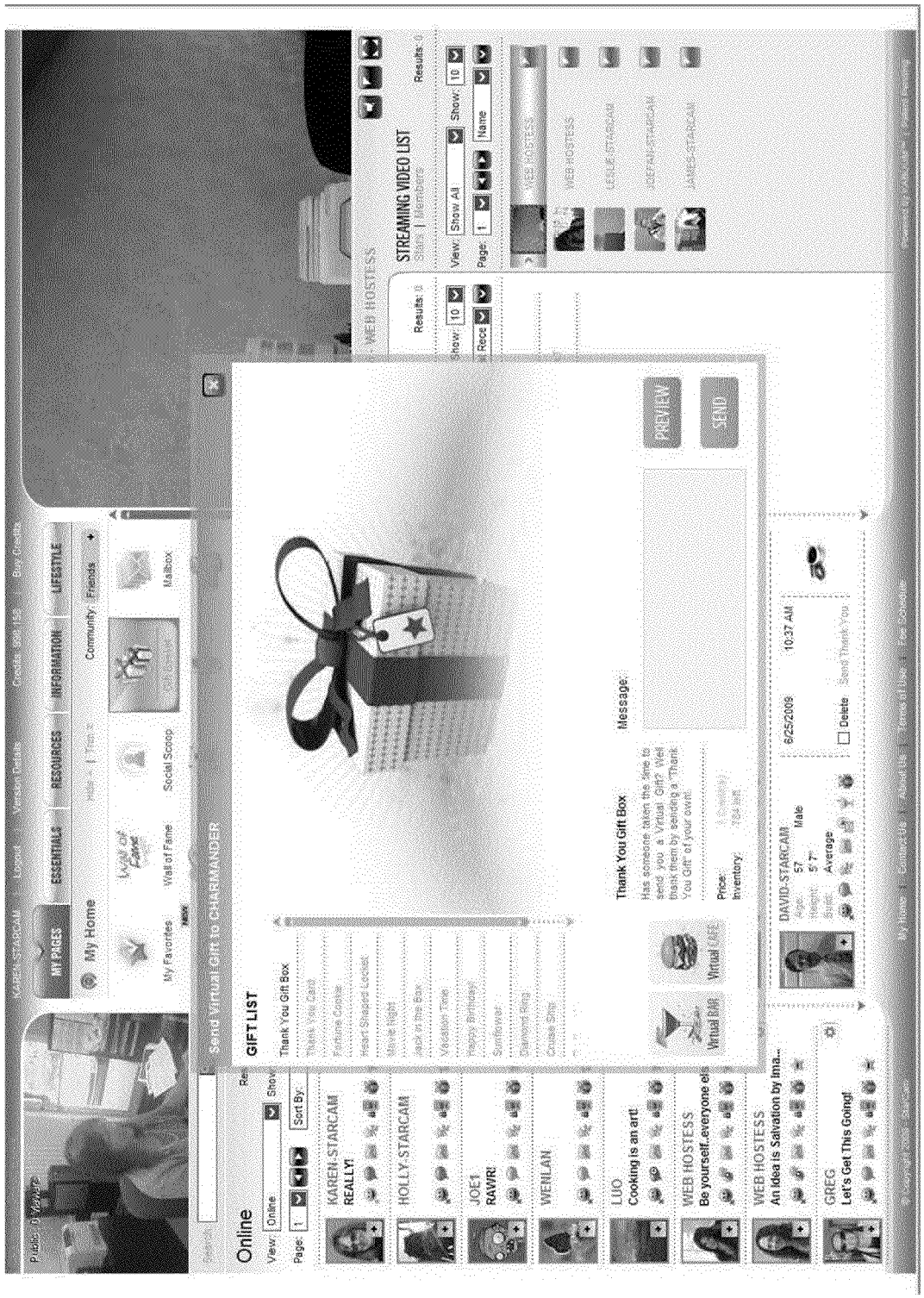
Figure 42:
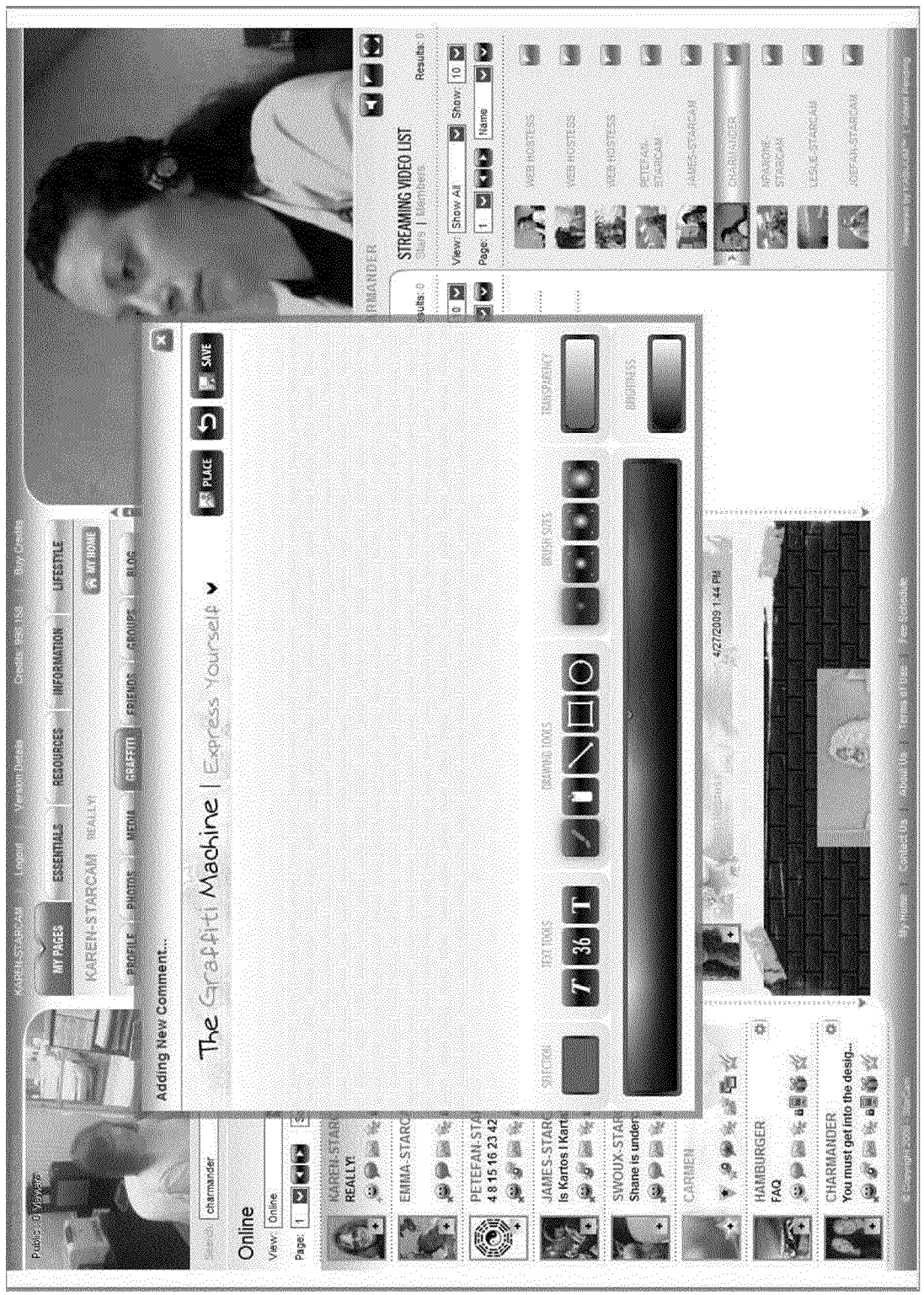
Figure 43:
Figure 45:
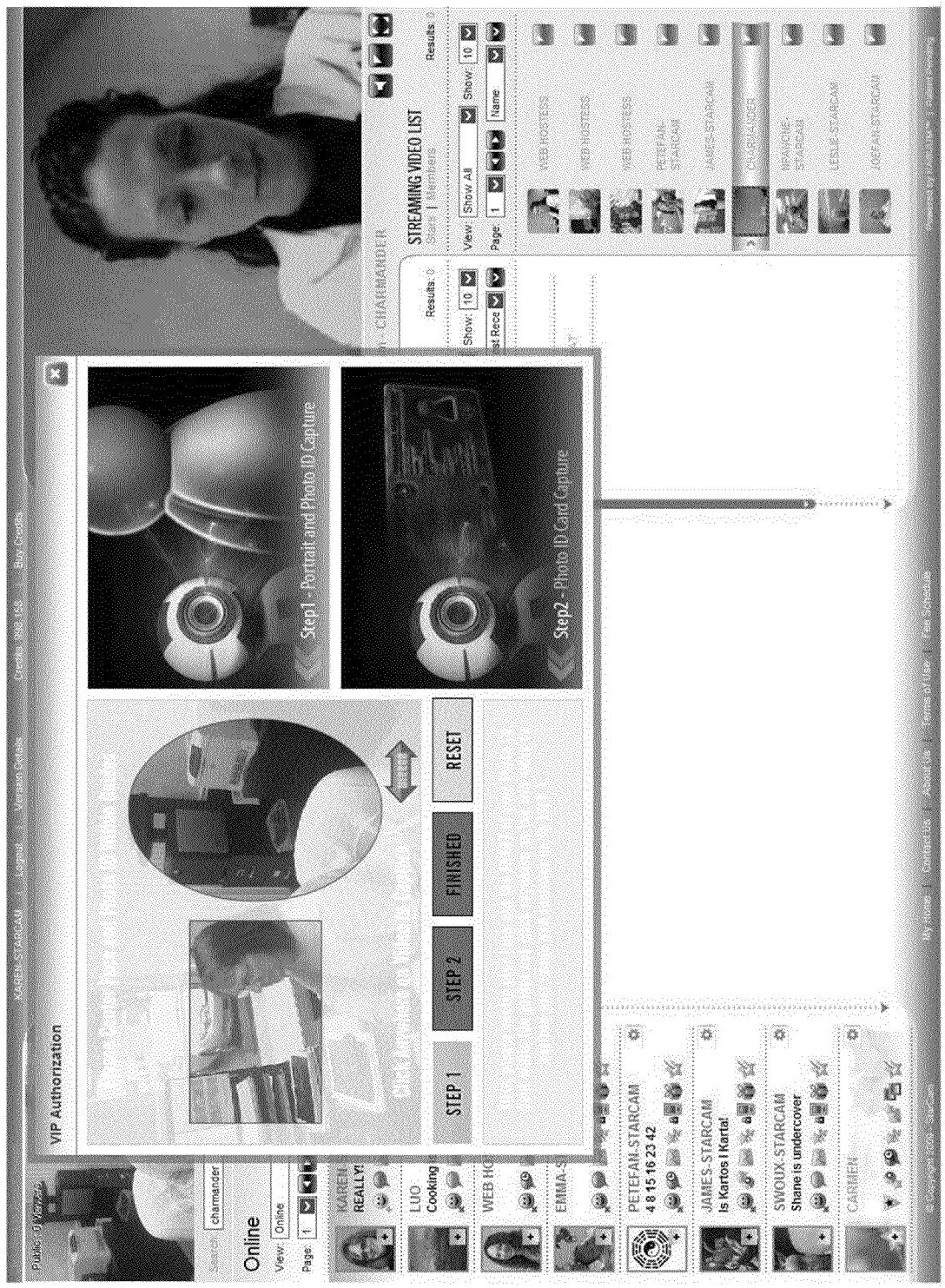
Figure 46:
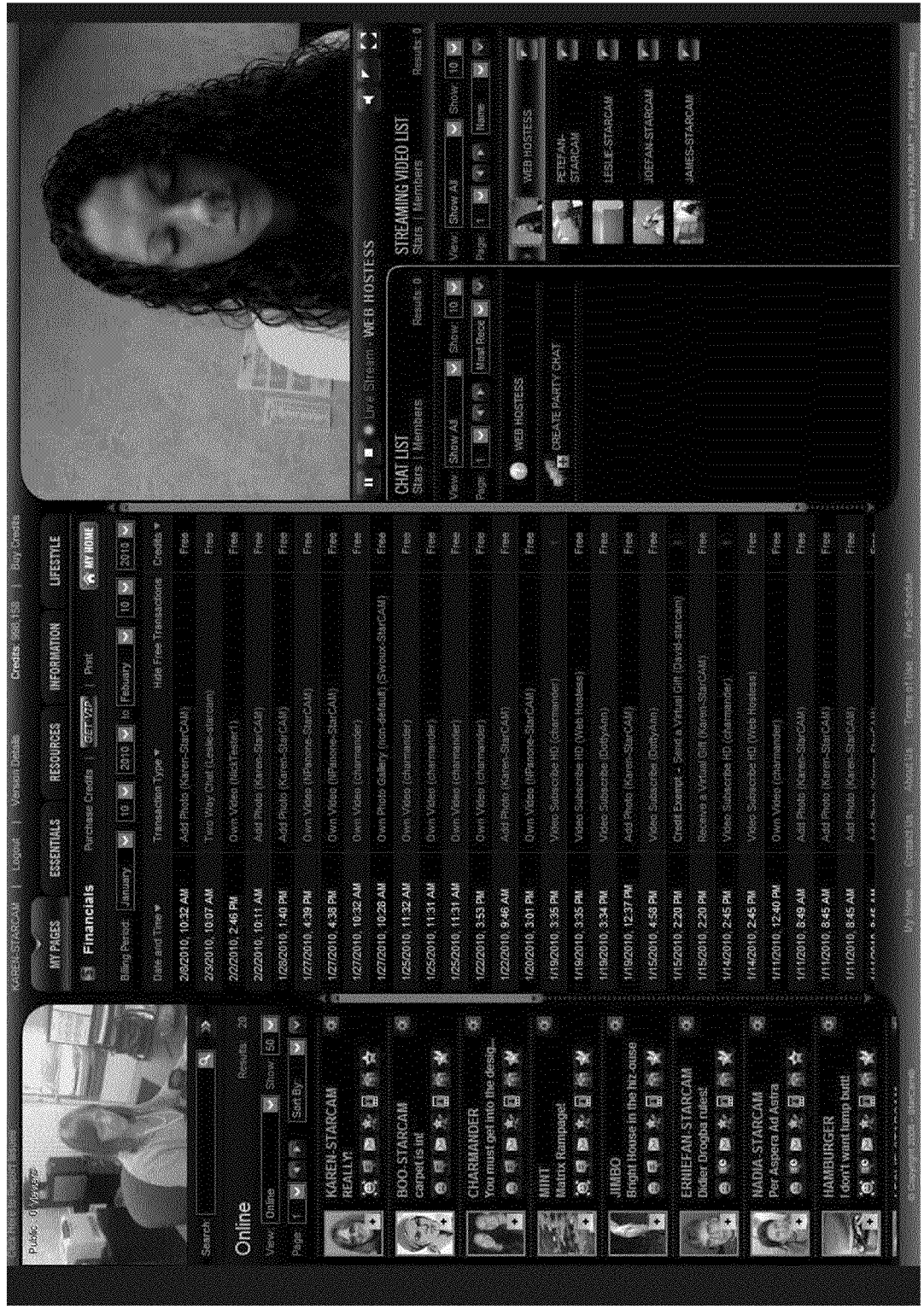
Figure 47:
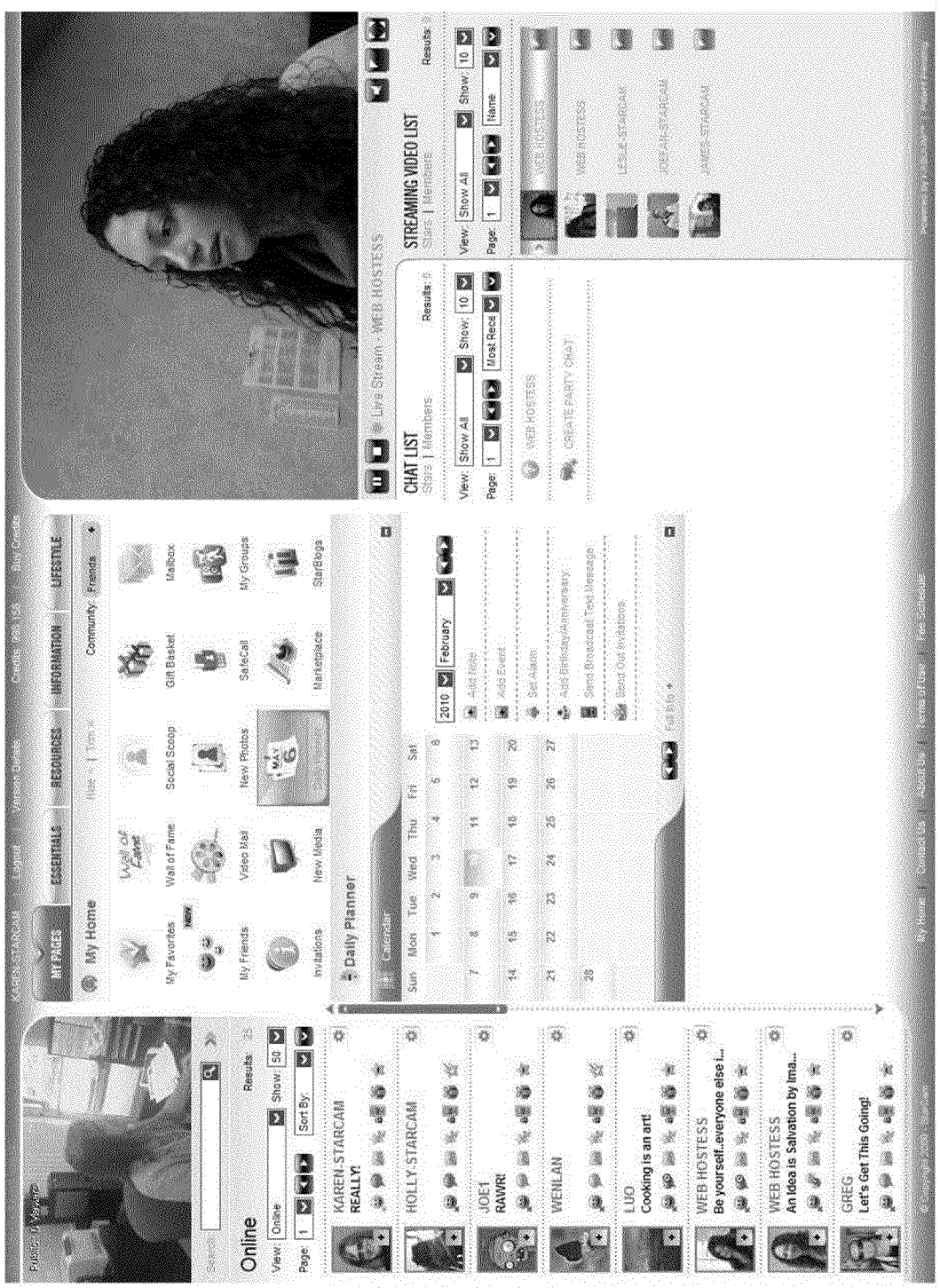
Figure 48:
Figure 49:
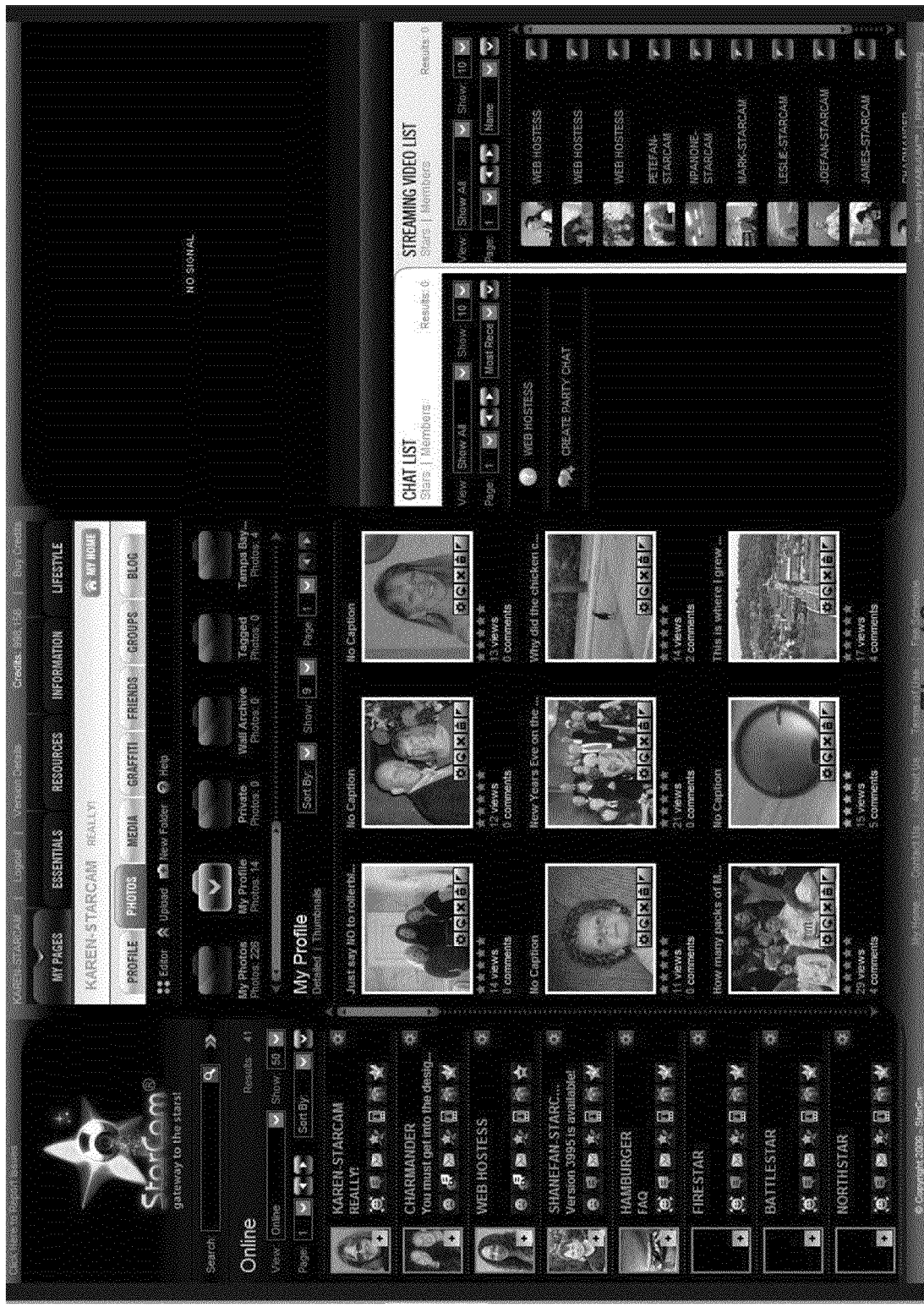
Figure 50:
Figure 51:
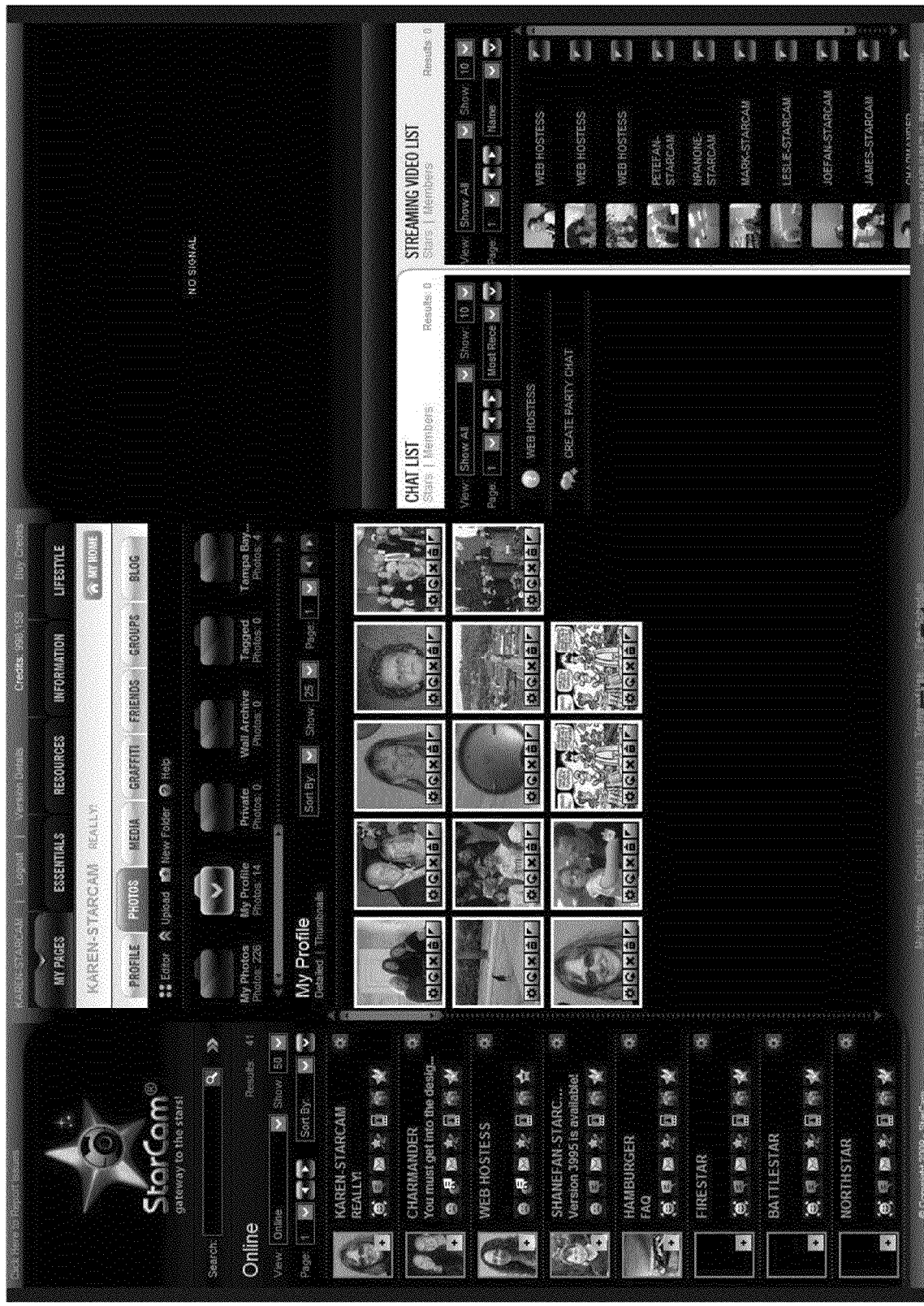
Figure 52:
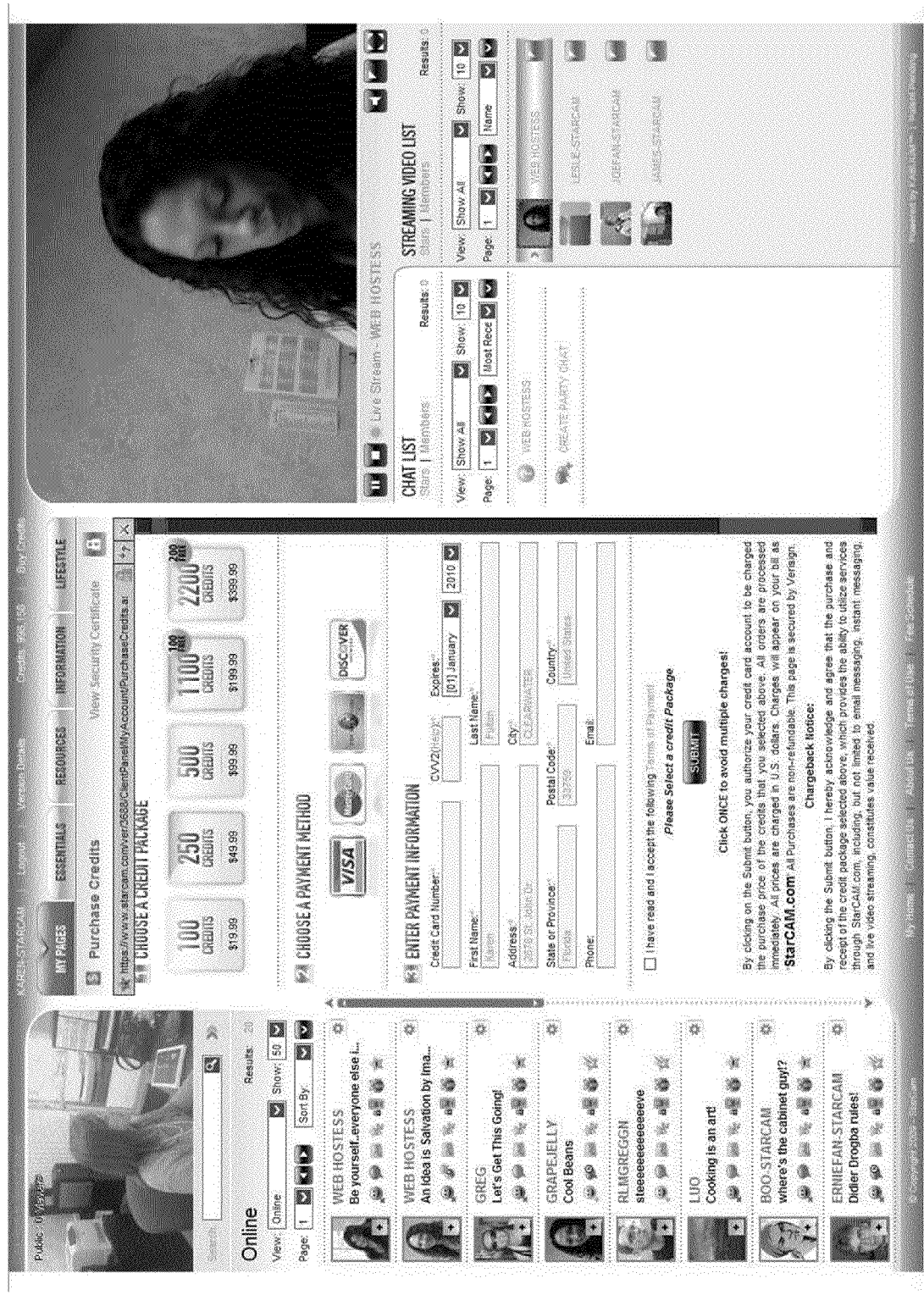
Figure 53:
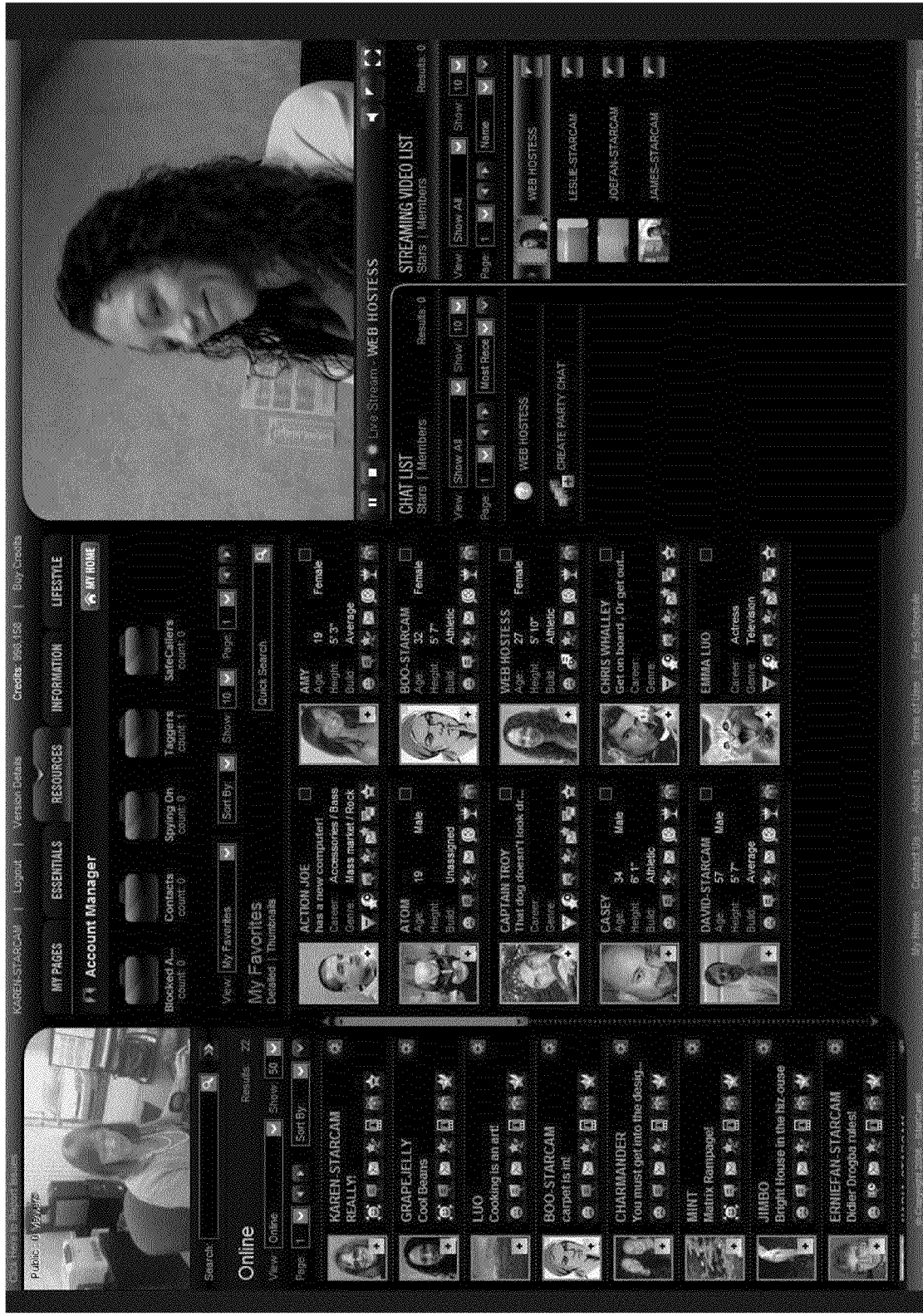
Figure 54:
Figure 55:
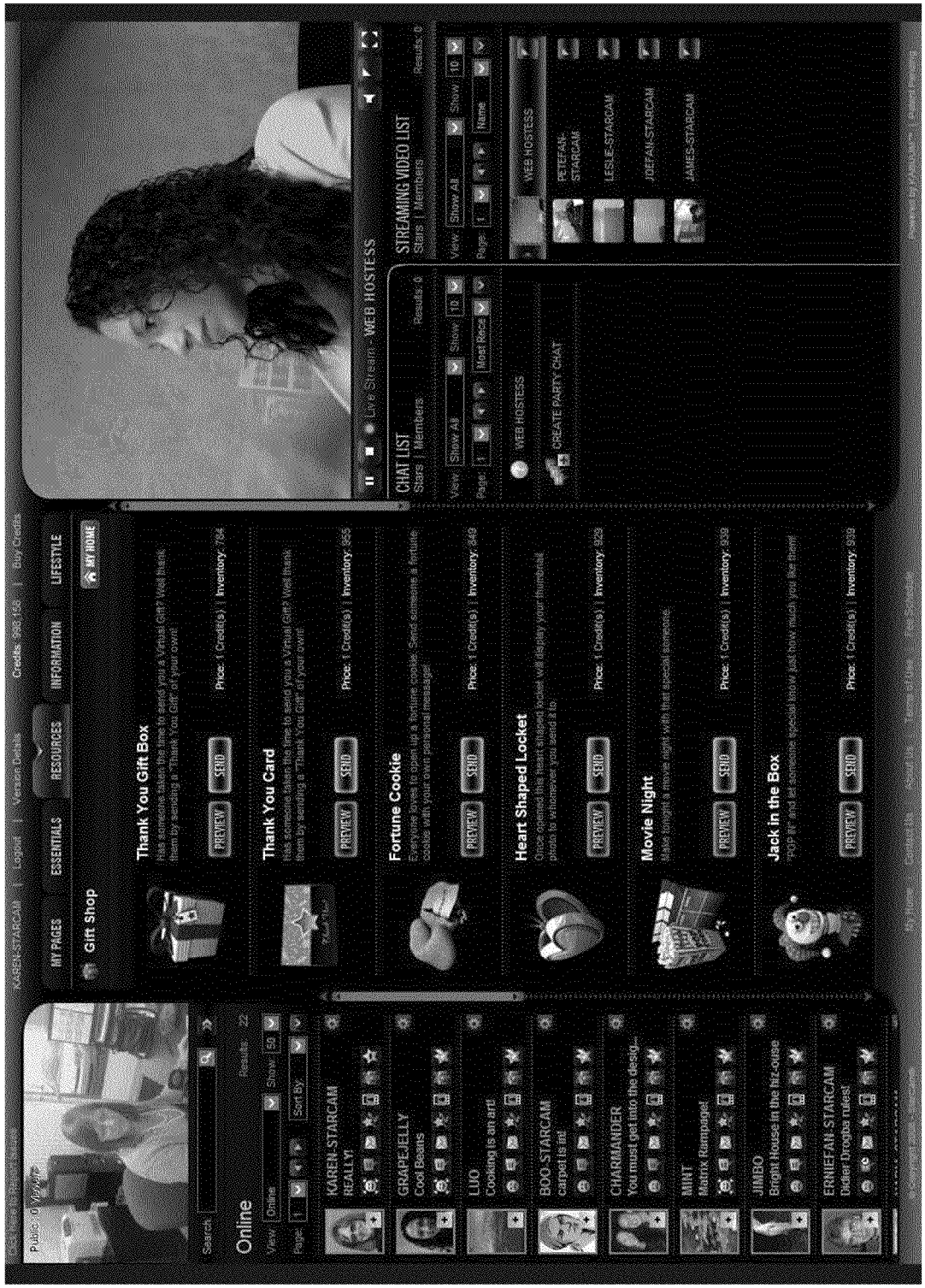
Figure 56:
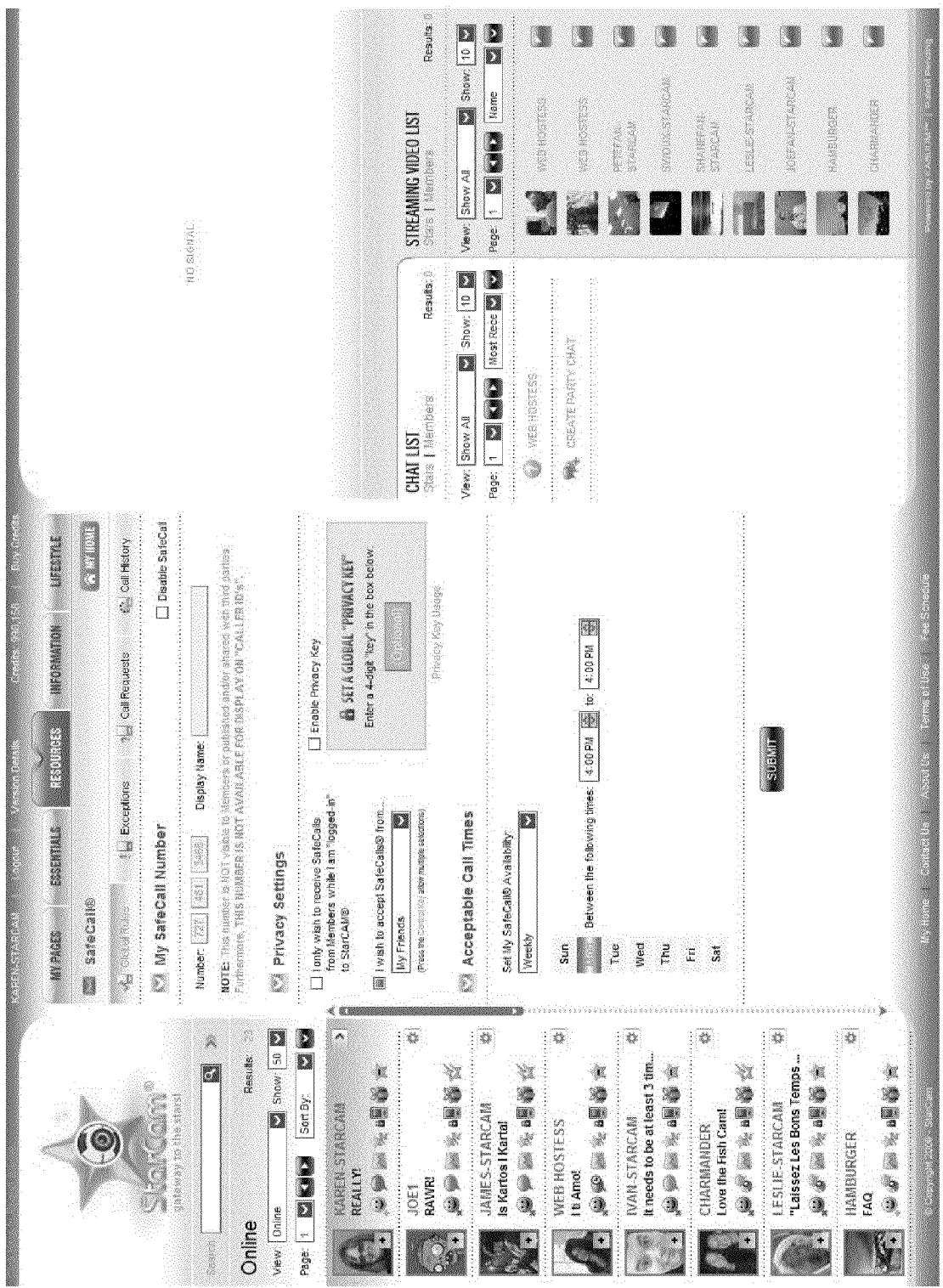
Figure 57:

FIG. 6 illustrates a method 600 of updating a dynamic display field 155 to efficiently utilize space, according to embodiments of the present invention. As shown in FIG. 6, at 610, the display system 100 can detect a change to the useable display area 152. At 620, the display system 100 can determine the current state of the dynamic display field 155, collapsed or expanded. If the dynamic display field 155 is currently expanded, at 630, the display system 100 can then determine whether the change to the useable display area 152 meets the criteria for applying the collapsed state. If these collapsed state criteria are met, then the display system 100 can transition the dynamic display field 155 to the collapsed state, at 640. Otherwise, if the criteria are not met, at 690, the display system 100 can wait for another change to the useable display area 152 to, once again, begin determining whether a state change is appropriate. Alternatively, if the dynamic display field 155 is currently collapsed, at 650, the display system 100 can determine whether the change to the useable display area 152 meets the criteria for applying the expanded state. If these expanded state criteria are met, then the display system 100 can transition the dynamic display field 155 to the expanded state, at 660. Otherwise, if the criteria are not met, at 690, the display system 100 can wait for another change to the useable display area 152 to begin determining whether a state change is appropriate. The display system 100 can repeat this method 600, beginning at 610, upon another detection of a change to the useable display area 152.

The method 600 depicted in FIG. 6 is not the only method that can be used to update a dynamic display field 155, and various modifications can be made to the updating method 600 without departing from the invention. For example, and not limitation, some embodiments of the display system 100 need not detect the current state of the dynamic display field 155 in order to update the dynamic display field 155. Upon detecting a size change, the display system 100 can determine which state the dynamic display field 155 should be in given the new size of the useable display area 152, taking the size change into account. The display system 100 can then redraw the dynamic display field 155, or the entire graphical user interface 150, based on the new size of the useable display area 152. This can result in redrawing the dynamic display field 155 when the state of the dynamic display field 155 is unchanged by the size change, but can also eliminate the need to determine the current state of the dynamic display field 155. Various other updating methods can also be provided to properly apply the states of the dynamic display field 155.

Accordingly, through providing a dynamic display field 155 in a graphical user interface 150, the display system 100 can make efficient use of space, while displaying a suitable amount of content to a user.

While display systems 100 and methods, graphical user interfaces 150, and dynamic display fields 155 of the present invention have been disclosed in exemplary forms, it will be apparent to those skilled in the art that many modifications, additions, and deletions can be made without departing from the spirit and scope of the present invention, as set forth in the following claims.

What is claimed is:

1. A display system comprising:
a display unit for communicating a dynamic display field to a user, the dynamic display field being bound by a useable display area and having a collapsed state and an expanded state;
wherein in the collapsed state, the dynamic display field comprises:
a shared content area; and
two or more content tags, each content tag corresponding to at least one of two or more displayable contents, including a first displayable content and a second displayable content;
wherein the shared content area is configured to show a displayable content corresponding to an active content tag of the two or more content tags, and is configured to show fewer than a total number of the displayable contents at a given time;
wherein in the expanded state the dynamic display field comprises:
a first content area configured to show the first displayable content;
a second content area configured to show the second content area while the first content area show the first displayable content; and
wherein a current state of the dynamic display field is dependent on the size of the useable display area;
a detection unit for detecting the size of the useable display area, and for determining whether the dynamic display field should be in the collapsed state or the expanded state based on the size of the useable display area; and
a computer processor for transitioning the dynamic display field between the collapsed state and the expanded state when indicated by the size of the useable display area.

2. The display system of claim 1, the detection unit being further configured to detect a change to the predetermined characteristic of the useable display area, and to determine whether the dynamic display field should be in the collapsed state or the expanded state based on the change to the predetermined characteristic of the useable display area.

3. The display system of claim 1, the useable display area being a virtual window in which the dynamic display field is displayed, wherein detection unit is configured to detect a change to the size of the virtual window.

4. The display system of claim 3, wherein, when the dynamic display field is in the expanded state, the first content area and the second content area share the virtual window.

5. The display system of claim 3, wherein the computer processor transitions the dynamic display field to the expanded state when the virtual window transitions from less than a predetermined width to greater than a predetermined width.

6. The display system of claim 5, wherein the computer processor transitions the dynamic display field to the collapsed state when the virtual window transitions from greater than a predetermined width to less than a predetermined width.

7. The display system of claim 3, wherein the computer processor transitions the dynamic display field to the expanded state when the virtual window transitions from less than a predetermined height to greater than a predetermined height.

8. The display system of claim 7, wherein the computer processor transitions the dynamic display field to the collapsed state when the virtual window transitions from greater than a predetermined height to less than a predetermined height.

9. The display system of claim 1, the computer processor transitioning the dynamic display field to the collapsed state when a measure of the useable display area is less than a predetermined threshold.

10. The display system of claim 9, the computer processor transitioning the dynamic display field to the collapsed state when the width of the useable display area is less than a predetermined threshold.

11. The display system of claim 10, the computer processor transitioning the dynamic display field to the expanded state when the width of the useable display area is greater than a predetermined threshold.

12. The display system of claim 1, the computer processor transitioning the dynamic display field to the expanded state when a measure of the useable display area is greater than a predetermined threshold.

13. The display system of claim 1, the shared content area being configured to show no more than one displayable content at a time.

14. The display system of claim 1, the display unit being configured to dynamically update which of the displayable contents are shown in the shared content area, based on selections of the content tags received from a user.

15. The display system of claim 1, the dynamic display field being wider in the expanded state than in the collapsed state.

16. The display system of claim 15, the first content area and the second content area occupying a wider space when the dynamic display field is in the expanded state than the shared content area occupies when the dynamic display field is in the collapsed state.

17. The display system of claim 1, the dynamic display field being taller in the expanded state than in the collapsed state.

18. The display system of claim 17, the first content area and the second content area occupying a taller space when the dynamic display field is in the expanded state than the shared content area occupies when the dynamic display field is in the collapsed state.

* * * * *